(12) United States Patent
Oasa

(10) Patent No.: US 11,028,558 B2
(45) Date of Patent: Jun. 8, 2021

(54) WORK VEHICLE AND CONTROL METHOD FOR WORK VEHICLE

(71) Applicant: KOMATSU LTD., Tokyo (JP)

(72) Inventor: Takahisa Oasa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/627,041

(22) PCT Filed: Jan. 21, 2019

(86) PCT No.: PCT/JP2019/001673
§ 371 (c)(1),
(2) Date: Dec. 27, 2019

(87) PCT Pub. No.: WO2019/163361
PCT Pub. Date: Aug. 29, 2019

(65) Prior Publication Data
US 2020/0123740 A1    Apr. 23, 2020

(30) Foreign Application Priority Data
Feb. 23, 2018 (JP) .............................. JP2018-030734

(51) Int. Cl.
*E02F 9/22* (2006.01)
*E02F 3/43* (2006.01)
(Continued)

(52) U.S. Cl.
CPC ............ *E02F 9/2253* (2013.01); *E02F 3/431* (2013.01); *E02F 9/2235* (2013.01);
(Continued)

(58) Field of Classification Search
CPC ....... E02F 9/2253; E02F 3/431; E02F 9/2235; E02F 9/2292; E02F 9/2296; F16H 61/425; F16H 61/435; F16H 61/47
See application file for complete search history.

(56) References Cited

U.S. PATENT DOCUMENTS 5,784,883 A     7/1998 Ohkura et al.
8,532,888 B2 *  9/2013 Ishibashi ................. F16H 61/47
                                                         701/51
(Continued)

FOREIGN PATENT DOCUMENTS

CN    102884312 A    1/2013
CN    105960553 A    9/2016
(Continued)

OTHER PUBLICATIONS

The International Search Report for the corresponding international application No. PCT/JP2019/001673, dated Apr. 16, 2019.
(Continued)

*Primary Examiner* — Thomas E Lazo
(74) *Attorney, Agent, or Firm* — Global IP Counselors, LLP

(57) ABSTRACT

A controller determines a compensation factor from an operating amount of an accelerator operating member and a hydraulic pressure of at least one of a first circuit and a second circuit. The controller determines a target vehicle speed from the operating amount of the accelerator operating member. The controller determines at least one of a target displacement of a travel pump and a target displacement of a travel motor from the target vehicle speed and the compensation factor.

13 Claims, 18 Drawing Sheets

(51) Int. Cl.
   *F16H 61/425* (2010.01)
   *F16H 61/435* (2010.01)
   *F16H 61/47* (2010.01)

(52) U.S. Cl.
   CPC .......... *E02F 9/2292* (2013.01); *E02F 9/2296* (2013.01); *F16H 61/425* (2013.01); *F16H 61/435* (2013.01); *F16H 61/47* (2013.01)

(56) References Cited

U.S. PATENT DOCUMENTS

| | | | |
|---|---|---|---|
| 8,769,945 B2* | 7/2014 | Shirao | F16H 61/4061 60/444 |
| 9,074,546 B2* | 7/2015 | Asami | E02F 9/2292 |
| 2009/0235655 A1 | 9/2009 | Koehler et al. | |
| 2013/0239558 A1 | 9/2013 | Shirao | |
| 2013/0249214 A1 | 9/2013 | Ichinose et al. | |
| 2014/0290236 A1 | 10/2014 | Aizawa et al. | |
| 2014/0305113 A1* | 10/2014 | Salaris | F16H 61/421 60/327 |

FOREIGN PATENT DOCUMENTS

| | | |
|---|---|---|
| DE | 10 2006 029 904 A1 | 1/2008 |
| EP | 1 002 685 A2 | 5/2000 |
| EP | 3 553 348 A1 | 10/2019 |
| JP | 8-135789 A | 5/1996 |
| JP | 2013-190088 A | 9/2013 |
| JP | 2014-206271 A | 10/2014 |
| WO | 2011/131286 A1 | 10/2011 |
| WO | 2014/006302 A1 | 1/2014 |

OTHER PUBLICATIONS

The Office Action for the corresponding Chinese application No. 201980003621.6, dated Sep. 25, 2020.

The extended European search report for the corresponding European application No. 19758053.3, dated Dec. 2, 2020.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2019/001673, filed on Dec. 9, 2019. This U.S. National stage application claims priority under 35 U.S.C. § 119(a) to Japanese Patent Application No. 2018-030734, filed in Japan on Feb. 23, 2018, the entire contents of which are hereby incorporated herein by reference.

BACKGROUND

Field of the Invention

The present invention relates to a work vehicle and a control method for the work vehicle.

Background Information

A work vehicle may be provided with a hydrostatic transmission. The hydrostatic transmission includes a travel pump, a travel motor, and a hydraulic circuit connecting the travel pump and the travel motor. The travel pump is driven by an engine to discharge hydraulic fluid. The hydraulic fluid discharged from the travel pump is supplied to the travel motor through the hydraulic circuit. The travel motor is driven by the hydraulic fluid from the travel pump. The travel motor is connected to the travel device of the work vehicle and the travel motor is driven whereby the work vehicle travels. A desired vehicle speed and a desired tractive force can be achieved with the hydrostatic transmission by controlling the displacement of the travel pump and the displacement of the travel motor.

SUMMARY

However, when controlling the displacement of the travel pump and the displacement of the travel motor, the differential pressure in the hydraulic circuit may not reach a value set as a target due to the effect of leakage or the like of the hydraulic fluid from the hydraulic circuit. In such a case, the vehicle speed or the tractive force may diverge from the desired values.

An object of the present invention is to achieve a desired output with accuracy even when the actual differential pressure diverges from the target differential pressure in a work vehicle provided with a hydrostatic transmission.

A work vehicle according to a first aspect is provided with an engine, a hydrostatic transmission, a pressure sensor, an accelerator operating member, an accelerator operating sensor, and a controller. The hydrostatic transmission includes a travel pump, a travel motor, and a hydraulic circuit. The travel pump is driven by the engine and includes a first pump port and a second pump port. The travel motor includes a first motor port and a second motor port.

The hydraulic circuit connects the travel pump and the travel motor. The hydraulic circuit includes a first circuit connecting the first pump port and the first motor port, and a second circuit connecting the second pump port and the second motor port. The pressure sensor outputs a signal indicative of the hydraulic pressure in at least one of the first circuit and the second circuit. The accelerator operating sensor outputs a signal indicative of an operating amount of the accelerator operating member.

The controller receives the signals from the pressure sensor and the accelerator operating sensor. The controller determines a compensation factor from the operating amount of the accelerator operating member and from the hydraulic pressure in at least one of the first circuit and the second circuit. The controller determines a target vehicle speed from the operating amount of the accelerator operating member. The controller determines a target displacement of the travel pump and/or a target displacement of the travel motor from the target vehicle speed and the compensation factor.

In the work vehicle according to the present aspect, the compensation factor is calculated from the operating amount of the accelerator operating member and the hydraulic pressure in at least one of the first circuit and the second circuit, and the target displacement of the travel pump and/or the target displacement of the travel motor is determined from the target vehicle speed and the compensation factor. As a result, the target displacement of the travel pump and/or the target displacement of the travel motor can be determined based on the compensation factor even if the actual differential pressure diverges from the target differential pressure due to the effect of leakage or the like of hydraulic fluid in the hydraulic circuit. Consequently, a desired output of the work vehicle can be achieved with accuracy.

The pressure sensor may include a first pressure sensor and a second pressure sensor. The first pressure sensor may output a signal indicative of the hydraulic pressure in the first circuit. The second pressure sensor may output a signal indicative of the hydraulic pressure in the second circuit. The controller may determine a target differential pressure between the first circuit and the second circuit from the operating amount of the accelerator operating member. The controller may acquire the actual differential pressure between the first circuit and the second circuit from the signal of the first pressure sensor and the signal of the second pressure sensor. The controller may determine the compensation factor based on the target differential pressure and the actual differential pressure. In this case, the compensation factor can be determined in accordance with the divergence of the target differential pressure and the actual differential pressure. The controller may determine the compensation factor based on a ratio between the target differential pressure and the actual differential pressure.

The controller may determine a corrected target vehicle speed based on the target vehicle speed and the compensation factor. The controller may determine the target displacement of the travel pump and/or the target displacement of the travel motor from the corrected target vehicle speed. In this case, the desired output of the work vehicle can be achieved with accuracy by correcting the target vehicle speed with the compensation factor. The controller may determine the corrected target vehicle speed by multiplying the target vehicle speed by the compensation factor.

The controller may determine a target rotation speed of the engine from the operating amount of the accelerator operating member. The controller may determine a corrected target rotation speed based on the target rotation speed of the engine and the compensation factor. The controller may determine the target displacement of the travel pump and/or the target displacement of the travel motor from the corrected target rotation speed. In this case, the desired output of the work vehicle can be achieved with accuracy by compensating the target rotation speed of the engine with the compensation factor. The controller may determine the corrected target rotation speed by dividing the target rotation speed of the engine by the compensation factor.

The controller may determine a primary target value of the displacement of the travel pump from the target vehicle speed. The controller may determine the target displacement of the travel pump based on the primary target value and the compensation factor. In this case, the desired output of the work vehicle can be achieved with accuracy by compensating the target value of the displacement of the travel pump with the compensation factor. The controller may determine the target displacement of the travel pump by multiplying the primary target value by the compensation factor.

The controller may determine a primary target value of the displacement of the travel motor from the target vehicle speed. The controller may determine the target displacement of the travel motor based on the primary target value and the compensation factor. In this case, the desired output of the work vehicle can be achieved with accuracy by compensating the target value of the displacement of the travel motor with the compensation factor in accordance with the divergence between the target differential pressure and the actual differential pressure. The controller may determine the target displacement of the travel motor by dividing the primary target value by the compensation factor.

The controller may determine a target gear ratio of the hydrostatic transmission from the target differential pressure. The controller may determine a corrected target gear ratio based on the target gear ratio and the compensation factor. The controller may determine the target displacement of the travel pump and/or the target displacement of the travel motor from the corrected target gear ratio. In this case, the desired output of the work vehicle can be achieved with accuracy by compensating the target gear ratio with the compensation factor. The controller may determine the corrected target gear ratio by dividing the target gear ratio by the compensation factor.

The work vehicle may be further provided with a work implement operating member and a work implement operating sensor. The work implement operating sensor may output a signal indicative of the operating amount of the work implement operating member. The controller may receive the signal from the work implement operating sensor. The controller may determine a target input horsepower of the hydrostatic transmission from the operating amount of the accelerator operating member. The controller may determine a target rotation speed of the engine from the target input horsepower and the operating amount of the work implement operating member. The controller may determine a pump target differential pressure indicative of a target value of the differential pressure between the first circuit and the second circuit for the travel motor, from the target input horsepower and the target rotation speed of the engine. The controller may determine a motor target differential pressure indicative of a target value of the differential pressure between the first circuit and the second circuit for the travel motor, from the target vehicle speed and the target output horsepower. The controller may determine the larger of the pump target differential pressure and the motor target differential pressure as the target differential pressure.

In this case, the target rotation speed of the engine is determined from the target input horsepower of the hydrostatic transmission and the operating amount of the work implement operating member. As a result, the operator can appropriately adjust the actuation speed of the work implement by operating the work implement operating member. In addition, the target input horsepower inputted to the hydrostatic transmission may be determined from the operating amount of the accelerator operating member. As a result, the operator can appropriately adjust the traveling performance of the work vehicle by operating the accelerator operating member. Therefore, the operation of the work implement and the operation of traveling by work vehicle can be carried out easily.

A method according to a second aspect is executed by a controller for controlling a work vehicle. The work vehicle is provided with an engine, a hydrostatic transmission, and an accelerator operating member. The hydrostatic transmission includes a travel pump, a travel motor, and a hydraulic circuit. The travel pump is driven by the engine and includes a first pump port and a second pump port. The travel motor includes a first motor port and a second motor port. The hydraulic circuit connects the travel pump and the travel motor. The hydraulic circuit includes a first circuit connecting the first pump port and the first motor port, and a second circuit connecting the second pump port and the second motor port.

The method according to the present aspect comprises the following processes. A first process involves receiving a signal indicative of the hydraulic pressure of at least one of the first circuit and the second circuit. A second process involves receiving a signal indicative of an operating amount of the accelerator operating member. A third process involves determining a compensation factor from the operating amount of the accelerator operating member and the hydraulic pressure of at least one of the first circuit and the second circuit. A fourth process involves determining a target vehicle speed from the operating amount of the accelerator operating member. A fifth process involves determining a target displacement of the travel pump and/or a target displacement of the travel motor from the target vehicle speed and the compensation factor.

In the method according to the present aspect, the compensation factor is determined from the operating amount of the accelerator operating member and the hydraulic pressure of at least one of the first circuit and the second circuit, and the target displacement of the travel pump and/or the target displacement of the travel motor is determined from the target vehicle speed and the compensation factor. As a result, the target displacement of the travel pump and/or the target displacement of the travel motor can be determined based on the compensation factor even if the actual differential pressure diverges from the target differential pressure due to the effect of leakage or the like of hydraulic fluid in the hydraulic circuit. Consequently, a desired output of the work vehicle can be achieved with accuracy.

According to the present invention, a desired output in a work vehicle provided with a hydrostatic transmission can be achieved with accuracy even when the actual differential pressure and the target differential pressure diverge.

DETAILED DESCRIPTION OF EMBODIMENT(S)

Figure 1:
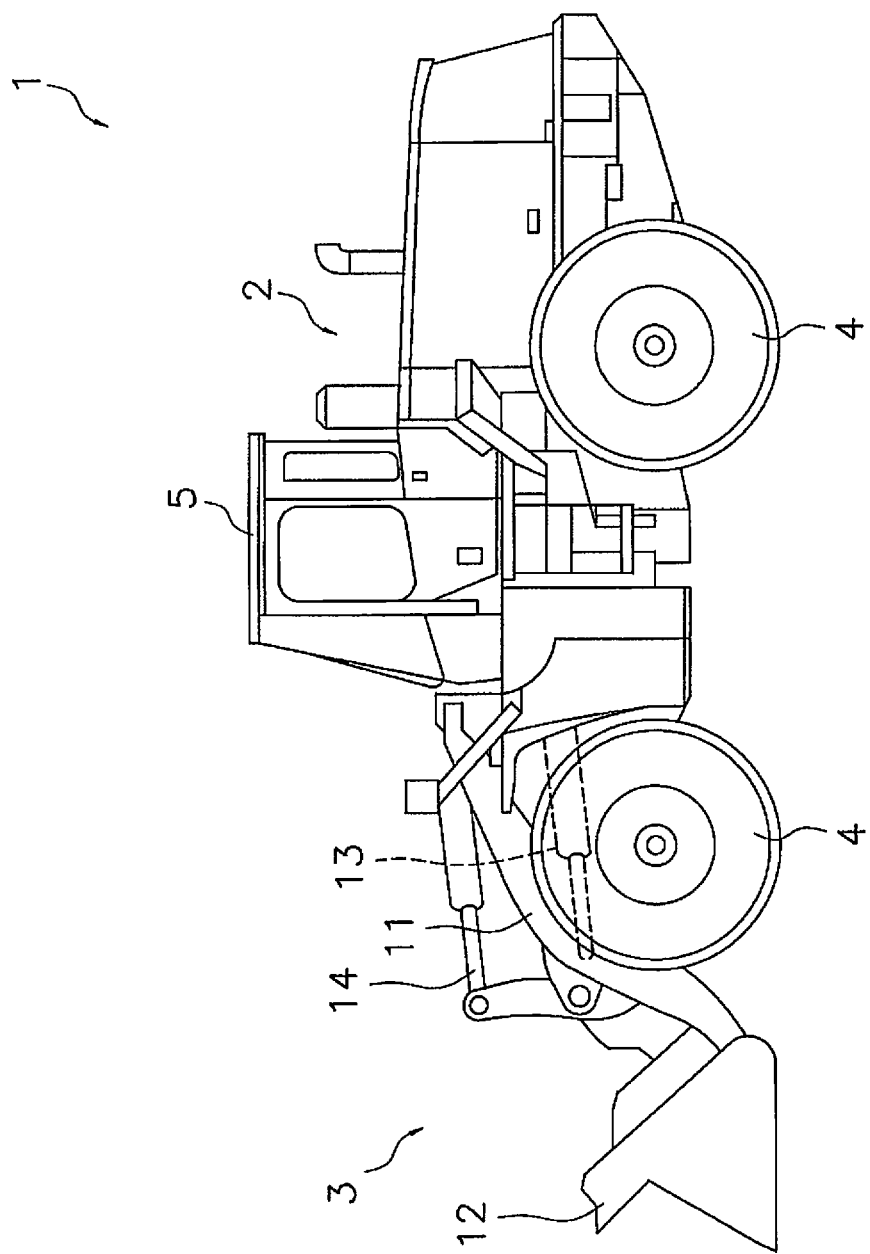
FIG. 1 is a side view of a work vehicle according to an embodiment.

Herein, a work vehicle 1 according to a first embodiment of the present invention will be explained in reference to the drawings. FIG. 1 is a side view of the work vehicle 1. The work vehicle 1 is a wheel loader. The work vehicle 1 includes a vehicle body 2, a work implement 3, a plurality of traveling wheels 4, and a cab 5. The work implement 3 is mounted onto a front portion of the vehicle body 2. The work implement 3 includes a boom 11, a bucket 12, a lifting cylinder 13, and a bucket cylinder 14.

The boom 11 is rotatably attached to the vehicle body 2. The boom 11 is driven by the lift cylinder 13. The bucket 12 is rotatably attached to the boom 11. The bucket 12 moves up and down by means of the bucket cylinder 14. The cab 5 is disposed on the vehicle body 2. The plurality of traveling wheels 4 are rotatably attached to the vehicle body 2.

Figure 2:
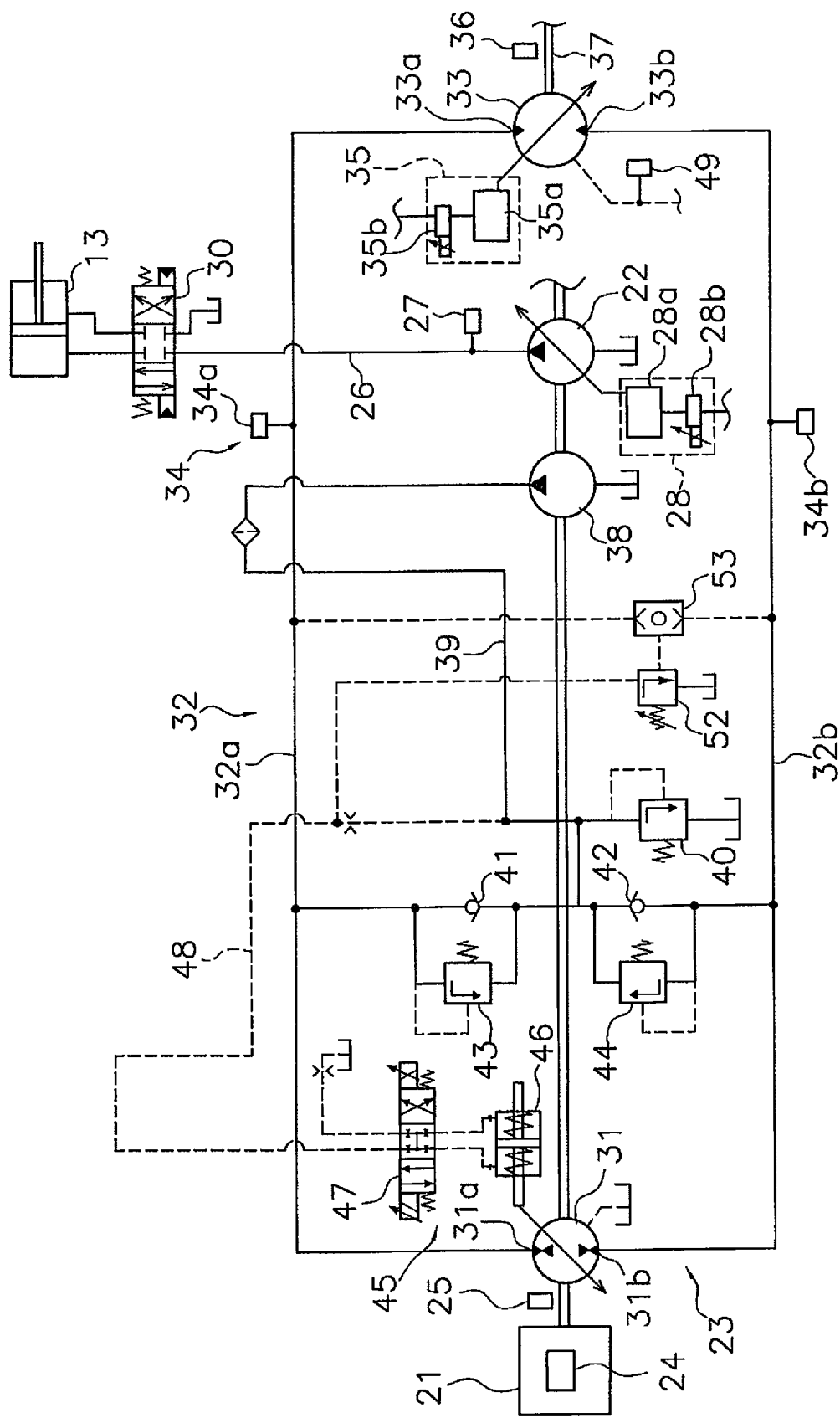
FIG. 2 is a block diagram illustrating a configuration of a drive system of the work vehicle.

FIG. 2 is a block diagram illustrating a configuration of a drive system mounted on the work vehicle 1. The work vehicle 1 includes an engine 21, a work implement pump 22, and a hydrostatic transmission (referred to below as "HST") 23. The engine 21 is, for example, a diesel engine.

A fuel injection device 24 is connected to the engine 21. The fuel injection device 24 controls the fuel injection amount into the engine 21 whereby the output torque (referred to below as "engine torque") and the rotation speed of the engine 21 are controlled. The actual rotation speed of the engine 21 is detected by an engine rotation speed sensor 25. The engine rotation speed sensor 25 outputs a signal which indicates the actual rotation speed of the engine 21.

The work implement pump 22 is connected to the engine 21. The work implement pump 22 is driven by the engine 21 to discharge hydraulic fluid. The hydraulic fluid discharged from the work implement pump 22 is supplied through a work implement hydraulic circuit 26 to the lift cylinder 13. As a result, the work implement 3 is driven. The discharge pressure of the work implement pump 22 is detected by a work implement pump pressure sensor 27. The work implement pump pressure sensor 27 outputs a signal which indicates the discharge pressure of the work implement pump 22.

The work implement pump 22 is a variable displacement hydraulic pump. A pump displacement control device 28 is connected to the work implement pump 22. The pump displacement control device 28 controls the displacement of the work implement pump 22. The pump displacement control device 28 includes a servo piston 28a and a pump control valve 28b. The servo piston 28a is connected to the work implement pump 22. The servo piston 28a changes the tilt angle of the work implement pump 22 whereby the displacement of the work implement pump 22 is changed. The pump control valve 28b controls the hydraulic pressure supplied to the servo piston 28a thereby controlling the actions of the servo piston 28a. The work implement pump 22 may be a fixed displacement hydraulic pump.

A work implement control valve 30 is disposed in the work implement hydraulic circuit 26. The work implement control valve 30 controls the flow rate of the hydraulic fluid supplied to the lift cylinder 13 in response to a pilot pressure applied to the work implement control valve 30. While omitted in the drawings, the work implement control valve 30 may also control the flow rate of the hydraulic fluid supplied to the bucket cylinder 14. The flow rate of the hydraulic fluid signifies the amount of hydraulic fluid supplied per unit of time. The work implement control valve 30 is not limited to a hydraulic pilot control valve and may be an electromagnetic proportional control valve controlled electrically.

The HST 23 includes a travel pump 31, a drive hydraulic circuit 32, and a travel motor 33. The travel pump 31 is connected to the engine 21. The travel pump 31 is driven by the engine 11 to discharge hydraulic fluid. The travel pump 33 is a variable displacement hydraulic pump. The hydraulic fluid discharged from the travel pump 31 is fed through the drive hydraulic circuit 32 to the travel motor 33.

The drive hydraulic circuit 32 connects the travel pump 31 and the travel motor 33. The drive hydraulic circuit 32 includes a first drive circuit 32a and a second drive circuit 32b. The first drive circuit 32a connects a first pump port 31a of the travel pump 31 and a first motor port 33a of the travel motor 33. The second drive circuit 32b connects a second pump port 31b of the travel pump 31 and a second motor port 33b of the travel motor 33. The travel pump 31, the travel motor 33, the first drive circuit 32a, and the second drive circuit 32b configure a closed circuit.

By supplying hydraulic fluid from the travel pump 31 through the first drive circuit 32a to the travel motor 33, the travel motor 33 is driven in one direction (for example, the forward travel direction). In this case, the hydraulic fluid returns from the travel motor 33 through the second drive circuit 32b to the travel pump 31. By supplying hydraulic fluid from the travel pump 31 through the second drive circuit 32b to the travel motor 33, the travel motor 33 is driven in the other direction (for example, the reverse travel direction). In this case, the hydraulic fluid returns from the travel motor 33 through the first drive circuit 32a to the travel pump 31.

A drive circuit pressure sensor 34 is provided in the drive hydraulic circuit 32. The drive circuit pressure sensor 34 detects the pressure of the hydraulic fluid supplied through the first drive circuit 32a or the second drive circuit 32b to the travel motor 33. Specifically, the drive circuit pressure sensor 34 includes a first circuit pressure sensor 34a and a second circuit pressure sensor 34b.

The first circuit pressure sensor 34a detects the hydraulic pressure in the first drive circuit 32a. The second circuit pressure sensor 34b detects the hydraulic pressure in the second drive circuit 32b. The first circuit pressure sensor 34a outputs a signal which indicates the hydraulic pressure in the first drive circuit 32a. The second circuit pressure sensor 34b outputs a signal which indicates the hydraulic pressure in the second drive circuit 32b.

A temperature sensor 49 is provided in the drive hydraulic circuit 32. The temperature sensor 49 detects the temperature of the hydraulic fluid supplied to the travel motor 33. The temperature sensor 49 outputs a signal which indicates the temperature of the hydraulic fluid supplied to the travel motor 33.

The travel motor 33 is a variable displacement hydraulic pump. The travel motor 33 is driven by the hydraulic fluid discharged from the travel pump 31 to produce driving power for traveling. A motor displacement control device 35 is connected to the travel motor 33. The motor displacement control device 35 controls the displacement of the travel motor 33. The motor displacement control device 35 includes a motor cylinder 35a and a motor control valve 35b.

The motor cylinder 35a is connected to the travel motor 33. The motor cylinder 35a is driven by hydraulic pressure and changes the tilt angle of the travel motor 33. The motor control valve 35b is an electromagnetic proportional control valve controlled based on an instruction signal inputted to the motor control valve 35b. The motor control valve 35b actuates the motor cylinder 35a whereby the displacement of the travel motor 33 is changed.

The travel motor 33 is connected to a drive shaft 37. The drive shaft 37 is connected to the abovementioned traveling wheels 4 via axles which are not illustrated in the drawings. The rotation of the travel motor 33 is transmitted through the drive shaft 37 to the traveling wheels 4. As a result, the work vehicle 1 is able to travel.

A vehicle speed sensor 36 is provided in the work vehicle 1. The vehicle speed sensor 36 detects the vehicle speed. The vehicle speed sensor 36 outputs a signal which indicates the vehicle speed. For example, the vehicle speed sensor 36 detects the vehicle speed by detecting the rotation speed of the drive shaft 37.

The HST 23 includes a charge pump 38 and a charge circuit 39. The charge pump 38 is a fixed displacement hydraulic pump. The charge pump 38 is connected to the engine 21. The charge pump 38 is driven by the engine 2 to supply hydraulic fluid to the drive hydraulic circuit 32.

The charge circuit 39 is connected to the charge pump 38. The charge circuit 39 is connected to the first drive circuit 32a via a first check valve 41. The charge circuit 39 is connected to the second drive circuit 32b via a second check valve 42.

The charge circuit 39 is connected to the first drive circuit 32a via a first relief valve 43. The first relief valve 43 is opened when the hydraulic pressure in the first drive circuit 32a exceeds a predetermined relief pressure. The charge circuit 39 is connected to the second drive circuit 32b via a second relief valve 44. The second relief valve 44 is opened when the hydraulic pressure in the second drive circuit 32b exceeds a predetermined relief pressure.

A charge relief valve 40 is provided in the charge circuit 39. The charge relief valve 40 is opened when the hydraulic pressure in the charge circuit 39 exceeds a predetermined relief pressure. As a result, the hydraulic pressure in the charge circuit 39 is limited so as not to exceed the predetermined relief pressure.

A pump displacement control device 45 is connected to the travel pump 31. The pump displacement control device 45 controls the displacement of the travel pump 31. The displacement of the hydraulic pump signifies the discharge amount (cc/rev) of the hydraulic fluid per one rotation. In addition, the pump displacement control device 45 controls the discharge direction of the travel pump 31. The pump displacement control device 45 includes a pump control cylinder 46 and a pump control valve 47.

The pump control cylinder 46 is connected to the travel pump 31. The pump control cylinder 46 is driven by hydraulic pressure and changes the tilt angle of the travel pump 31. As a result, the pump control cylinder 46 changes the displacement of the travel pump 31. The pump control cylinder 46 is connected to the charge circuit 39 via a pump pilot circuit 48.

The pump control valve 47 is an electromagnetic proportional control valve controlled based on an instruction signal inputted to the pump control valve 47. The pump control valve 47 switches the supply direction of the hydraulic fluid to the pump control cylinder 46. The pump control valve 47 switches the supply direction of the hydraulic fluid to the pump control cylinder 46, thereby switching the discharge direction of the travel pump 31. As a result, the drive direction of the travel motor 33 is changed and the work vehicle 1 can be switched between forward travel and reverse travel.

In addition, the pump control valve 47 controls the pressure of hydraulic fluid supplied to the pump control cylinder 46 via the pump pilot circuit 48. Specifically, the pump control valve 47 changes the pressure of the hydraulic fluid supplied to the pump control cylinder 46 thereby adjusting the tilt angle of the travel pump 31. As a result, the displacement of the travel pump 31 is controlled.

The pump pilot circuit 48 is connected to a hydraulic fluid tank via a cutoff valve 52. A pilot port of the cutoff valve 52 is connected to the first drive circuit 32a and the second drive circuit 32b via a shuttle valve 53. The shuttle valve 53 introduces the largest (referred to below as "drive circuit pressure") of the hydraulic pressure of the first drive circuit 32a and the hydraulic pressure of the second drive circuit 32b to the pilot port of the cutoff valve 52.

The cutoff valve 52 enables communication between the pump pilot circuit 48 and the hydraulic fluid tank when the drive circuit pressure is equal to or greater than a predetermined cutoff pressure. As a result, the hydraulic pressure of the pump pilot circuit 48 falls whereby the displacement of the travel pump 31 is reduced. As a result, an increase in the drive circuit pressure is suppressed.

Figure 3:
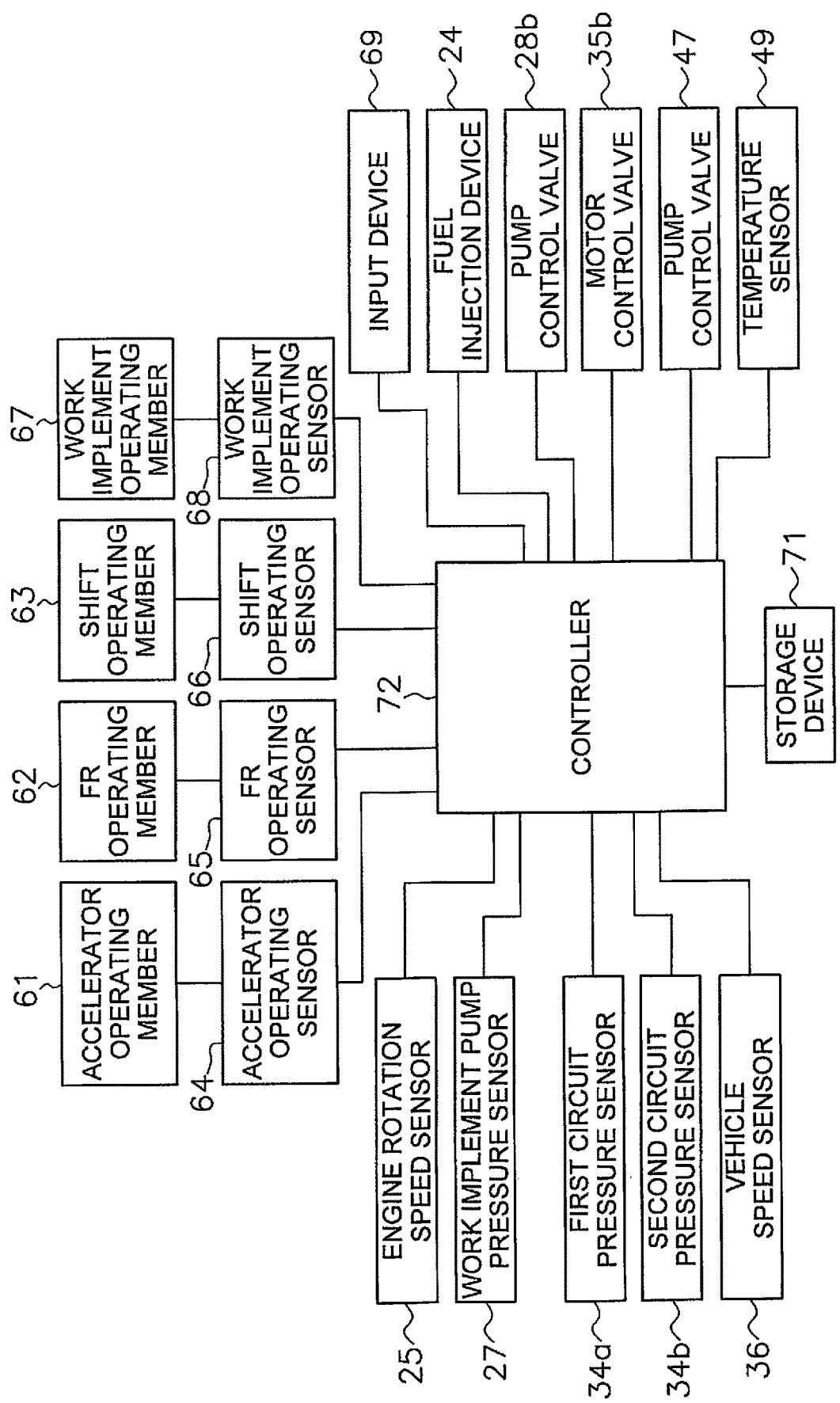
FIG. 3 is a block diagram illustrating a control system of the work vehicle.

FIG. 3 is a schematic view illustrating a control system of the work vehicle 1. As illustrated in FIG. 3, the work vehicle 1 includes an accelerator operating member 61, a FR operating member 62, and a shift operating member 63. The accelerator operating member 61, the FR operating member 62, and the shift operating member 63 are disposed so as to allow for operation by an operator. The accelerator operating member 61, the FR operating member 62, and the shift operating member 63 are disposed inside the cab 5.

The accelerator operating member 61 is, for example, an accelerator pedal. However, the accelerator operating member 61 may be another member such as a lever, a switch, or the like. The accelerator operating member 61 is connected to an accelerator operating sensor 64. The accelerator operating sensor 64 is, for example, a positional sensor for detecting the position of the accelerator operating member 61. The accelerator operating sensor 64 outputs a signal which indicates the operating amount (referred to below as "accelerator operating amount") of the accelerator operating member 61. The accelerator operating amount is expressed by a percentage where the state of the accelerator operating member 61 being fully open is, for example, 100%. As described below, the operator is able to control the vehicle speed and the tractive force by adjusting the accelerator operating amount.

The FR operating member 62 is, for example, an FR lever. However, the FR operating member 62 may be another member such as a switch. The FR operating member 62 is switched between a forward travel position, a reverse travel position, and a neutral position. The FR operating member 62 is connected to an FR operating sensor 65. The FR operating sensor 65 is, for example, a positional sensor for detecting the position of the FR operating member 62. The FR operating sensor 65 outputs a signal which indicates the position of the FR operating member 62. The operator can switch between forward and reverse travel of the work vehicle 1 by operating the FR operating member 62.

The shift operating member 63 is, for example, a dial type switch. However, the shift operating member 63 may be another member such as a lever. The shift operating member 63 is connected to a shift operating sensor 66. The shift operating sensor 66 is, for example, a positional sensor for detecting the position (referred to below as "shift position") of the shift operating member 63. The shift operating sensor 66 outputs a signal which indicates the shift position. The shift position includes, for example, first velocity to fourth velocity positions. However, the shift positions may include positions of velocities higher than the fourth velocity. Alternatively, the shift positions may include velocity positions from the first velocity to a position which are lower than the fourth velocity.

Figure 4:
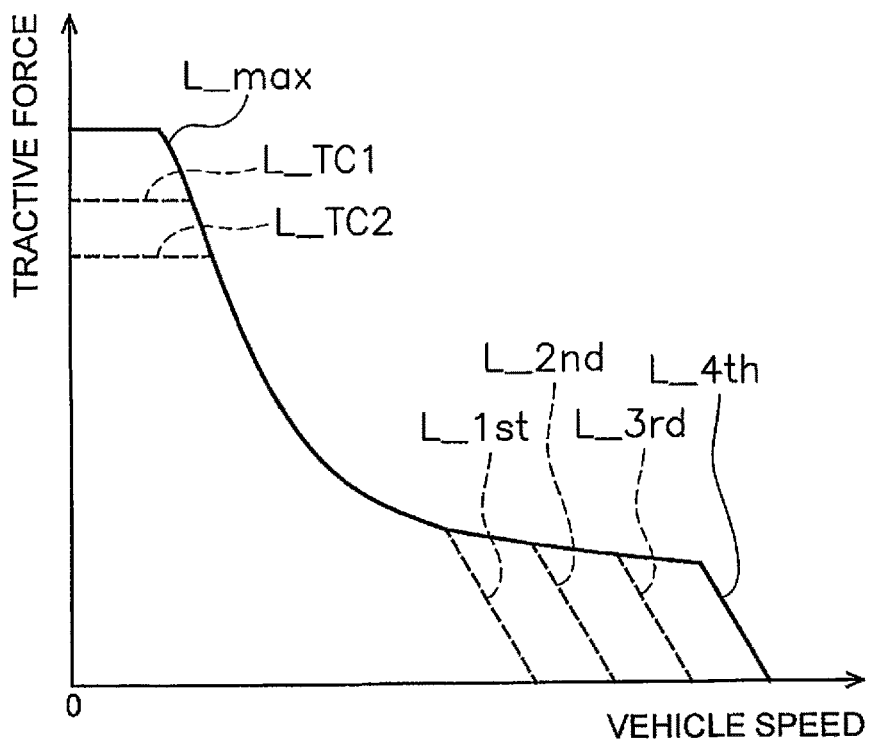
FIG. 4 illustrates vehicle speed–tractive force characteristics of the work vehicle.

FIG. 4 illustrates vehicle speed–tractive force characteristics of the work vehicle 1. As illustrated in FIG. 4, the operator is able to select a speed change pattern (L_1st to L_4th) that defines the maximum vehicle speed by operating the shift operating member 63.

The work vehicle 1 includes a work implement operating member 67. The work implement operating member 67 is, for example, an operating lever. However, the work implement operating member 67 may be another member such as a switch. A pilot pressure corresponding to the operation of the work implement operating member 67 is applied to the work implement control valve 30. The work implement operating member 67 is connected to a work implement operating sensor 68. The work implement operating sensor 68 is, for example, a pressure sensor. The work implement operating sensor 68 detects the operating amount (referred to below as "work implement operating amount") and the operating direction of the work implement operating member 67 and outputs a signal which indicates the work implement operating amount and operating direction. When the work implement control valve 30 is an electromagnetic proportional control valve instead of a pressure proportional control valve, the work implement operating sensor 68 may be a positional sensor for electrically detecting the position of the work implement operating member 67. The operator is able to operate the work implement 3 by operating the work implement operating member 67. For example, the operator is able to raise or lower the bucket 12 by operating the work implement operating member 67.

The work vehicle 1 has an input device 69. The input device 69 is, for example, a touch panel. However, the input device 69 is not limited to a touch panel and may be another type of device such as a switch. The operator is able to make various settings in the work vehicle 1 by operating the input device 69. For example, a traction control setting may be made with the input device 69. As illustrated in FIG. 4, traction control is a function that enables the selection of the maximum tractive force from a plurality of traction levels.

The plurality of traction levels includes a first level and a second level. In the first level, the maximum tractive force is limited to a value smaller than the normal maximum tractive force while the traction control is deactivated. In the second level, the maximum tractive force is limited to a value smaller than the maximum tractive force of the first level.

In FIG. 4, L_max represents the normal vehicle speed–tractive force characteristics of the work vehicle 1 while the traction control is deactivated. L_TC1 represents the vehicle speed–tractive force characteristics in the traction control at the first level. L_TC2 represents the vehicle speed–tractive force characteristics in the traction control at the second level.

As illustrated in FIG. 3, the work vehicle 1 includes a storage device 71 and a controller 72. The storage device 71 includes, for example, a memory and an auxiliary storage device. The storage device 71 may be a RAM or a ROM, for example. The storage device 71 may be a semiconductor memory or a hard disk, or the like. The storage device 71 is an example of a non-transitory computer-readable recording medium. The storage device 71 stores computer instructions for controlling the work vehicle 1 and that are executable by a processor.

The controller 72 includes, for example, a processor such as a CPU. The controller 72 is communicably connected to the abovementioned sensors, the input device 69, and the storage device 71. The controller 72 is communicably connected by wire or wirelessly to the abovementioned sensors, the input device 69, and the storage device 71. The controller 72 acquires various types of data by receiving signals from the sensors, the input device 69, and the storage device 71. The controller 72 is programmed so as to control the work vehicle 1 based on the acquired data. For example, the controller 72 may be configured by a plurality of controllers separate from each other.

The controller 72 is communicably connected by wire or wirelessly to the abovementioned control valves 35*b* and 47 and to the fuel injection device 24. The controller 72 controls the control valves 35*b* and 47 and the fuel injection device 24 by outputting instruction signals to the control valves 35*b* and 47 and to the fuel injection device 24.

Specifically, the controller 72 controls the engine torque and the engine rotation speed by outputting instruction signals to the fuel injection device 24. The controller 72 controls the displacement of the travel motor 33 by outputting instruction signals to the motor control valve 35*b*. The controller 72 controls the displacement of the travel pump 31 by outputting instruction signals to the pump control valve 47.

Control of the work vehicle 1 executed by the controller 72 will be explained next. In the work vehicle 1 according to the present embodiment, the controller 72 determines a target rotation speed (referred to below as "target engine rotation speed") of the engine 21 based on the accelerator operating amount and the work implement operating amount. The operator is able to increase the engine rotation speed by operating the work implement operating member 67 without operating the accelerator operating member 61. In addition, the traveling performance of the vehicle can be adjusted with the accelerator operating member 61 without effecting the operation of the work implement operating member 67 even when the work implement operating member 67 and the accelerator operating member 61 are operated at the same time.

Figure 5:
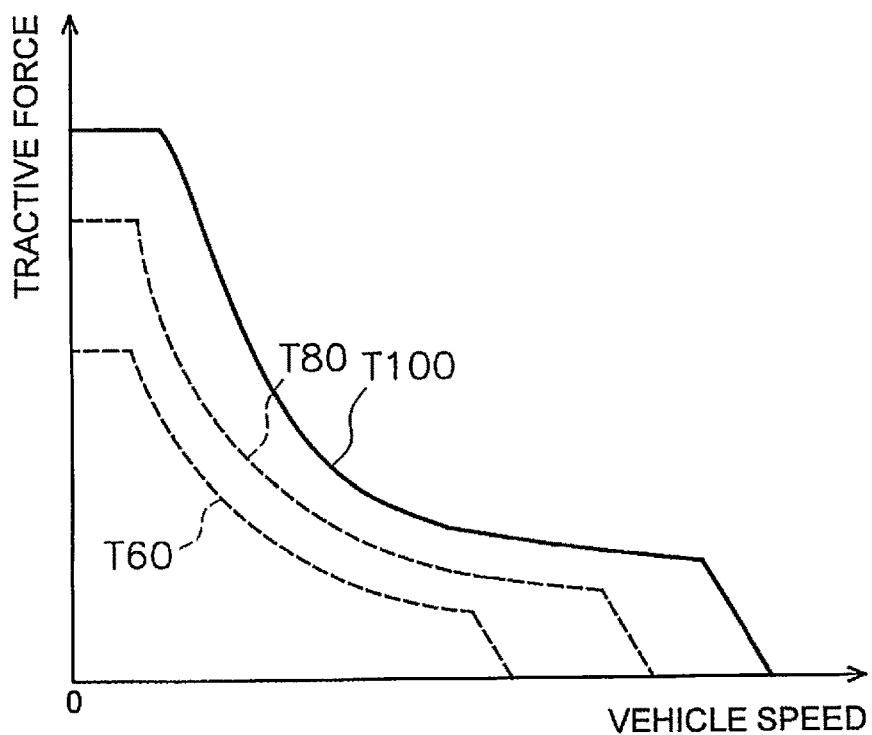
FIG. 5 illustrates an example of the vehicle speed–tractive force characteristics changed in response to the operation of an accelerator operating member.

FIG. 5 illustrates an example of vehicle speed–tractive force characteristics which are changed in accordance with the operation of the accelerator operating member 61 by the operator. In FIG. 5, T100 represents the vehicle speed–tractive force characteristics when the accelerator operating amount is 100%. T80 represents the vehicle speed–tractive force characteristics when the accelerator operating amount is 80%. T60 represents the vehicle speed–tractive force characteristics when the accelerator operating amount is 60%. In the work vehicle 1 according to the present embodiment, traveling performance (vehicle speed–tractive force characteristics) in accordance with the accelerator operating amount can be achieved even when the work implement operating member 67 and the accelerator operating member 61 are operated at the same time.

Figure 6:
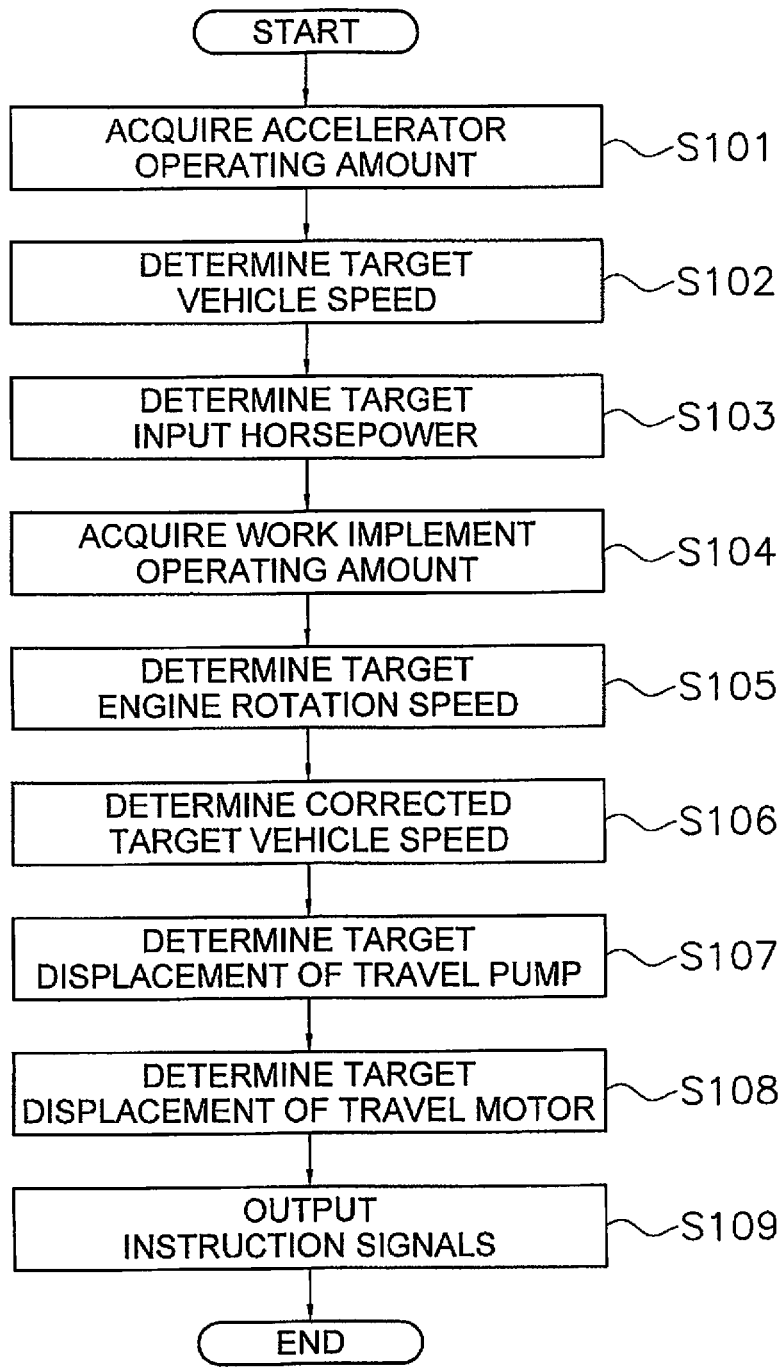
FIG. 6 is a flow chart of processing executed by a controller.

Processing executed by the controller 72 will be explained below. FIG. 6 is a flow chart illustrating processing executed by the controller 72. The following explanation refers to control when the work vehicle 1 is traveling forward. However, the same control may be performed when the work vehicle 1 is traveling in reverse.

As illustrated in, FIG. 6 in S101, the controller 72 acquires the accelerator operating amount. The controller 72 acquires the accelerator operating amount from a signal from the accelerator operating sensor 64.

Figure 7:
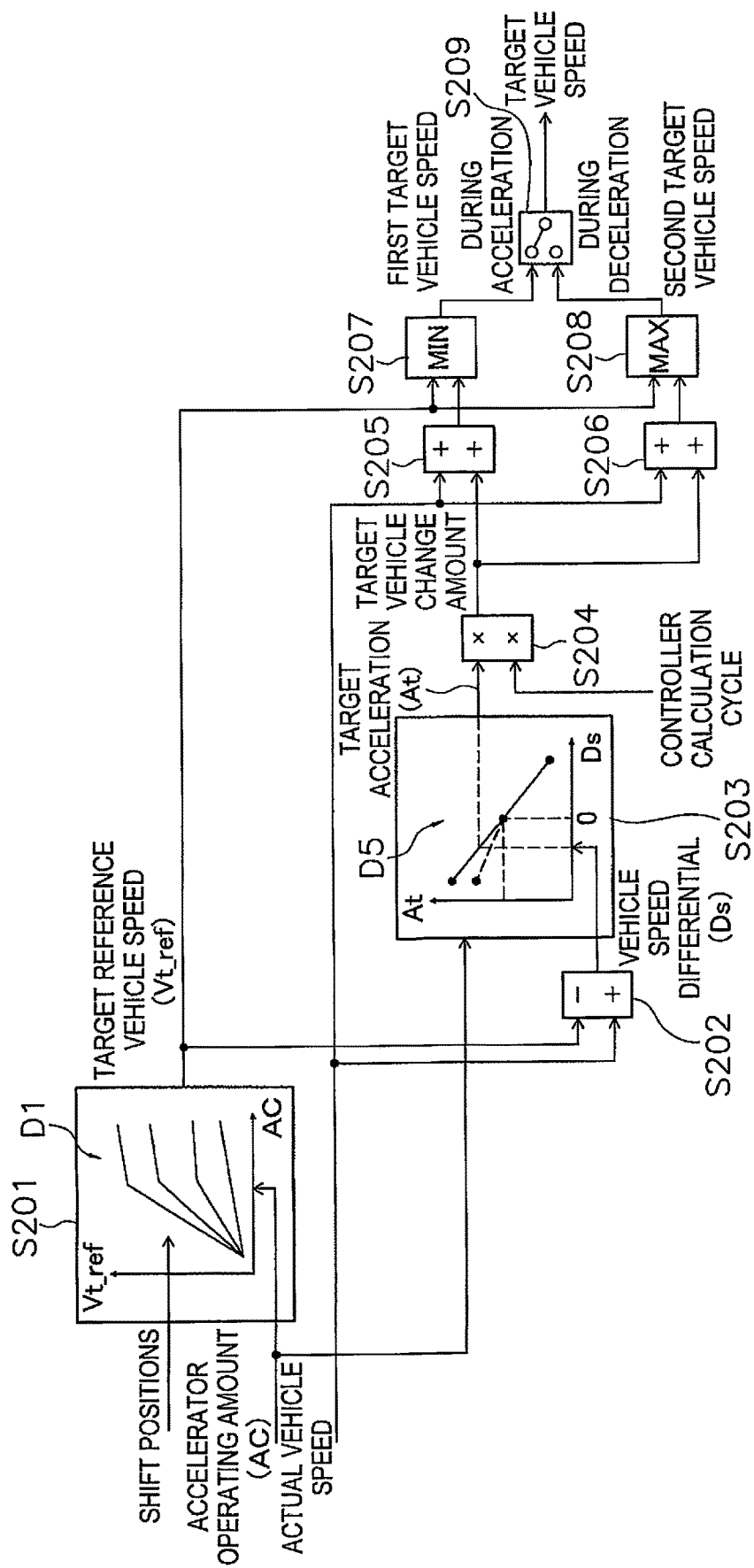
FIG. 7 illustrates processing for determining a target vehicle speed from the operating amount of the accelerator operating member.

In step S102, the controller 72 determines a target vehicle speed. The controller 72 determines the target vehicle speed from the accelerator operating amount. FIG. 7 illustrates processing for determining the target vehicle speed from the accelerator operating amount.

As illustrated in step S201 in FIG. 7, the controller 72 determines a target reference vehicle speed from the accelerator operating amount and the shift position. The target reference vehicle speed is the vehicle speed set as a target attainment vehicle speed when the work vehicle 1 is traveling on level ground. The storage device 71 stores reference vehicle speed data D1 which defines the relationship between the accelerator operating amount and the target reference vehicle speed. The target reference vehicle speed increases in accordance with an increase in the accelerator operating amount in the reference vehicle speed data D1. The relationship between the accelerator operating amount and the target reference vehicle speed is defined for each shift position in the reference vehicle speed data D1. The target reference vehicle speed increases as the shift position moves toward the high speed side in the reference vehicle speed data D1 even when the accelerator operating amount is the same. The controller 72 refers to the reference vehicle speed data D1 and determines the target reference vehicle speed corresponding to the accelerator operating amount and the shift position.

In step S202, the controller 72 calculates a vehicle speed differential. The vehicle speed differential is the difference between the target reference vehicle speed and the actual vehicle speed. In step S203, the controller 72 calculates a target acceleration. The controller 72 calculates the target acceleration from the vehicle speed differential and the accelerator operating amount. Specifically, the controller 72 refers to acceleration data D5 and calculates the target acceleration corresponding to the vehicle speed differential. The acceleration data D5 defines the relationship between the vehicle speed differential and the target acceleration. The target acceleration decreases as the vehicle speed differential increases in the acceleration data D5. The controller 72 changes the acceleration data D5 in response to the accelerator operating amount. The controller 72 changes the acceleration data D5 so that the target acceleration increases as the accelerator operating amount increases even if the vehicle speed differential is the same. The vehicle speed differential being a negative value signifies that the work vehicle 1 is accelerating. The vehicle speed differential being a positive value signifies that the work vehicle 1 is decelerating. The target acceleration being a positive value signifies acceleration and the target acceleration being a negative value signifies deceleration.

In step S204, the controller 72 calculates a target speed change amount from the target acceleration. The controller 72 calculates the target speed change amount by multiplying the target acceleration by the calculation cycle of the controller 72.

In step S205 and step S206, the controller 72 adds the target speed change amount to the actual vehicle speed. In step S207, the controller 72 selects the smaller (first target vehicle speed) of the value derived by adding the target speed change amount to the actual vehicle speed, and the target reference vehicle speed. In step S208, the controller 72 selects the larger (second target vehicle speed) of the value derived by adding the target speed change amount to the actual vehicle speed, and the target reference vehicle speed.

In step S209, the controller 72 determines the target vehicle speed in response to whether the work vehicle 1 is accelerating or decelerating. The controller 72 determines that the work vehicle 1 is accelerating when the actual vehicle speed is smaller than the target reference vehicle speed. The controller 72 determines that the work vehicle 1 is decelerating when the actual vehicle speed is greater than the target reference vehicle speed. The controller 72 determines the first target vehicle speed as the target vehicle speed during acceleration and determines the second target vehicle speed as the target vehicle speed during deceleration. When the target vehicle speed is a negative value the controller 72 sets the target vehicle speed to zero.

Next, as illustrated in step S103 in FIG. 6, the controller 72 determines a target input horsepower to the HST 23. The target input horsepower to the HST 23 signifies the horsepower distributed to the HST 23 from within the output horsepower of the engine 21. The controller 72 determines the target input horsepower from the accelerator operating amount.

Figure 8:
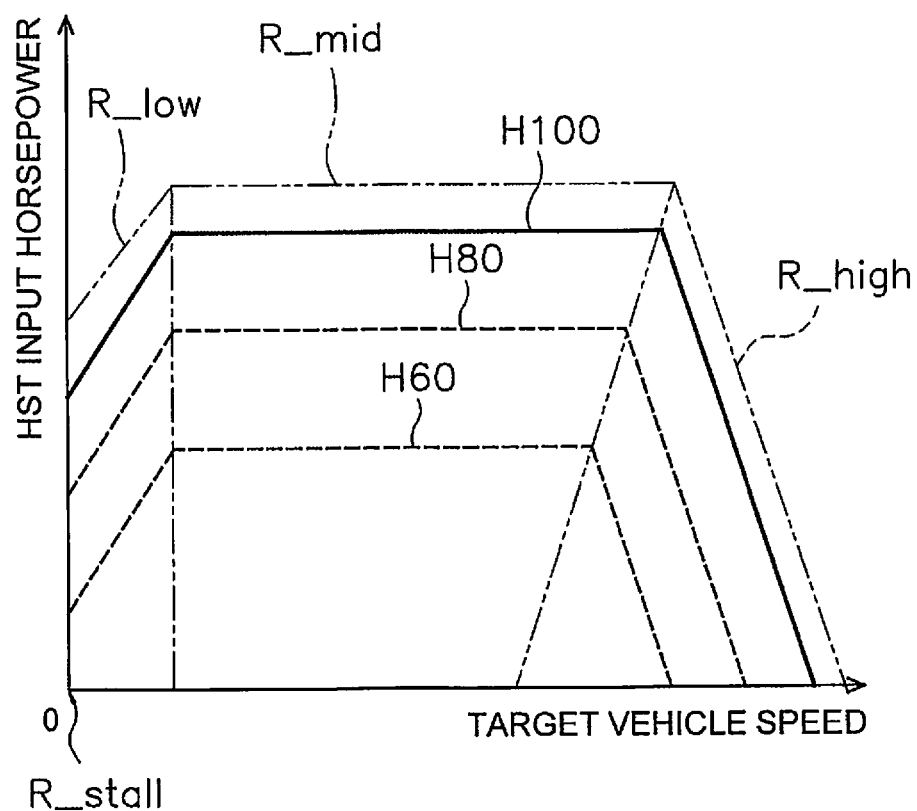
FIG. 8 illustrates target vehicle speed–input horsepower characteristics of the work vehicle.

FIG. 8 illustrates target vehicle speed–HST input horsepower characteristics of the work vehicle 1 according to the present embodiment. In FIG. 8, H100 represents the target vehicle speed–HST input horsepower characteristics when the accelerator operating amount is 100%. H80 represents the target vehicle speed–HST input horsepower characteristics when the accelerator operating amount is 80%. H60 represents the target vehicle speed–HST input horsepower characteristics when the accelerator operating amount is 60%.

As illustrated in FIG. 8, the controller 72 determines the target input horsepower to the HST 23 from the accelerator operating amount so that a traveling performance (vehicle speed–HST input horsepower characteristics) corresponding to the accelerator operating amount can be achieved. The controller 72 determines the target input horsepower to the HST 23 while stalled (R_stall), in a low vehicle speed region (R_low), an intermediate vehicle speed region (R_mid), and a high vehicle speed region (R_high) in accordance with the target vehicle speed.

Figure 9:
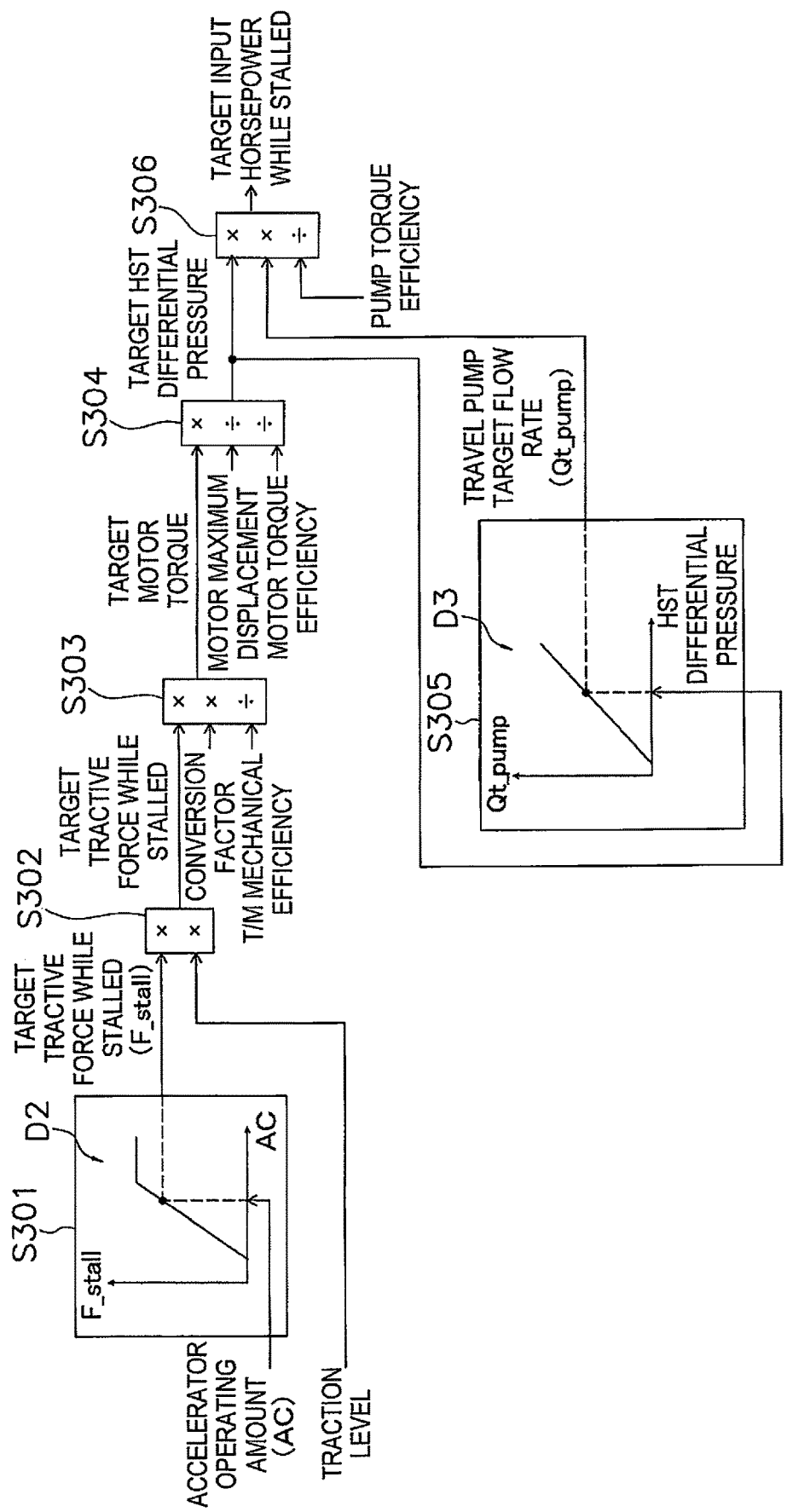
FIG. 9 illustrates processing for determining a target input horsepower when stalled.

FIG. 9 illustrates processing for determining the target input horsepower to the HST 23 while stalled. As illustrated in step S301 in FIG. 9, the controller 72 determines a target tractive force while stalled from the accelerator operating amount. The storage device 71 stores target tractive force data D2 which defines the relationship between the accelerator operating amount and the target tractive force while stalled. In the target tractive force data D2, the target tractive force increases as the accelerator operating amount increases. The controller 72 refers to the target tractive force data D2 and determines the target tractive force while stalled corresponding to the accelerator operating amount.

In step S302, the controller 72 multiplies the target tractive force while stalled determined in step S301 by a ratio corresponding to the traction level, thereby determining the target tractive force while stalled for each traction level. The aforementioned ratio is 1 during normal operation when traction control is not applied.

In step S303, the controller 72 converts the target tractive force while stalled as determined in step S302 to a target motor torque. The controller 72 multiplies the target tractive force by a predetermined conversion factor and divides the result by the transmission mechanical efficiency, thereby calculating the target motor torque. The predetermined conversion factor is a factor for converting the tractive force of the work vehicle 1 to the torque of the output shaft of the HST 23. The transmission mechanical efficiency is the transmission efficiency from the output shaft of the HST 23 to the traveling wheels 4.

In step S304, the controller 72 determines a target HST differential pressure from the target motor torque. The HST differential pressure is the difference between the hydraulic pressure in the first drive circuit 32a and the hydraulic pressure in the second drive circuit 32b. The controller 72 divides the target motor torque by the maximum displacement of the travel motor 33 and divides the result by the torque efficiency of the travel motor 33, thereby calculating the target HST differential pressure.

In step S305, the controller 72 determines a target flow rate of the travel pump 31 from the target HST differential pressure. The storage device 71 stores target flow rate data D3 which defines the relationship between the target HST differential pressure while stalled and the target flow rate of the travel pump 31. In the target flow rate data D3, the target flow rate of the travel pump 31 increases in accordance with an increase in the target HST differential pressure. The controller 72 refers to the target flow rate data D3 and determines the target flow rate of the travel pump 31 corresponding to the target HST differential pressure.

In step S306, the controller 72 determines the target input horsepower to the HST 23 while stalled from the target HST differential pressure and the target flow rate of the travel pump 31. The controller 72 multiplies the target HST differential pressure by the target flow rate of the travel pump 31 and divides the result by the pump torque efficiency, thereby determining the target input horsepower to the HST 23 while stalled.

Figure 10:
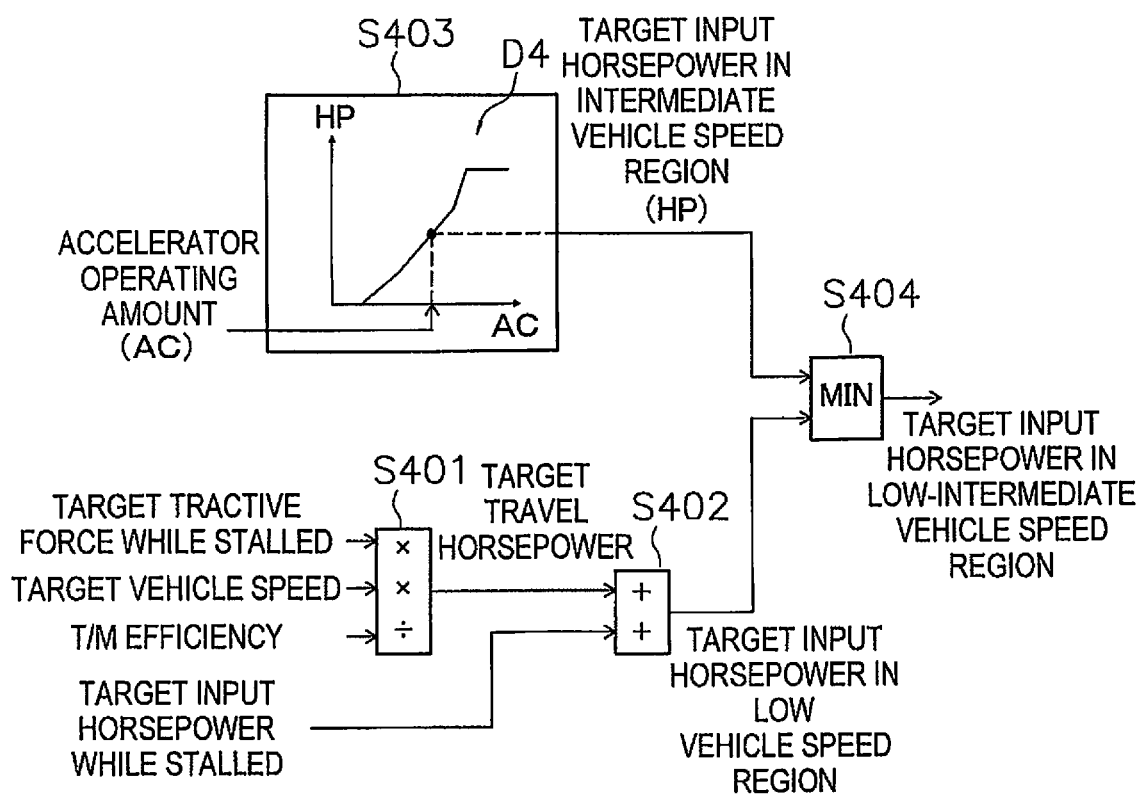
FIG. 10 illustrates processing for determining a target input horsepower in a low vehicle speed region and an intermediate vehicle speed region.

FIG. 10 illustrates processing for determining the target input horsepower to the HST 23 in the low vehicle speed region and in the intermediate vehicle speed region. As illustrated in step S401 in FIG. 10, the controller 72 determines a target travel horsepower from the target tractive force while stalled and the target vehicle speed. The controller 72 determines the target travel horsepower by multiplying the target tractive force while stalled by the target vehicle speed and dividing the result by the transmission efficiency. The transmission efficiency is the transmission efficiency from the input shaft of the HST 23 to the traveling wheels 4.

In step S402, the controller 72 determines the target input horsepower to the HST 23 in the low vehicle speed region from the target travel horsepower and the target input horsepower while stalled. The controller 72 determines the target input horsepower to the HST 23 in the low vehicle speed region by adding the target travel horsepower to the target input horsepower while stalled.

In step S403, the controller 72 determines the target input horsepower to the HST 23 in the intermediate vehicle speed region from the accelerator operating amount. The storage device 71 stores target input horsepower data D4 which defines the relationship between the accelerator operating amount and the target input horsepower to the HST 23. In the target input horsepower data D4, the target input horsepower increases in accordance with an increase in the accelerator operating amount. The controller 72 refers to the target input horsepower data D4 and determines the target input horsepower in the intermediate vehicle speed region corresponding to the accelerator operating amount.

In step S404, the controller 72 determines the smaller of the target input horsepower in the low vehicle speed region as determined in step S402 and the target input horsepower in the intermediate vehicle speed region as determined in step S403, as the target input horsepower to the HST 23 for the low-intermediate vehicle speed region.

Figure 11:
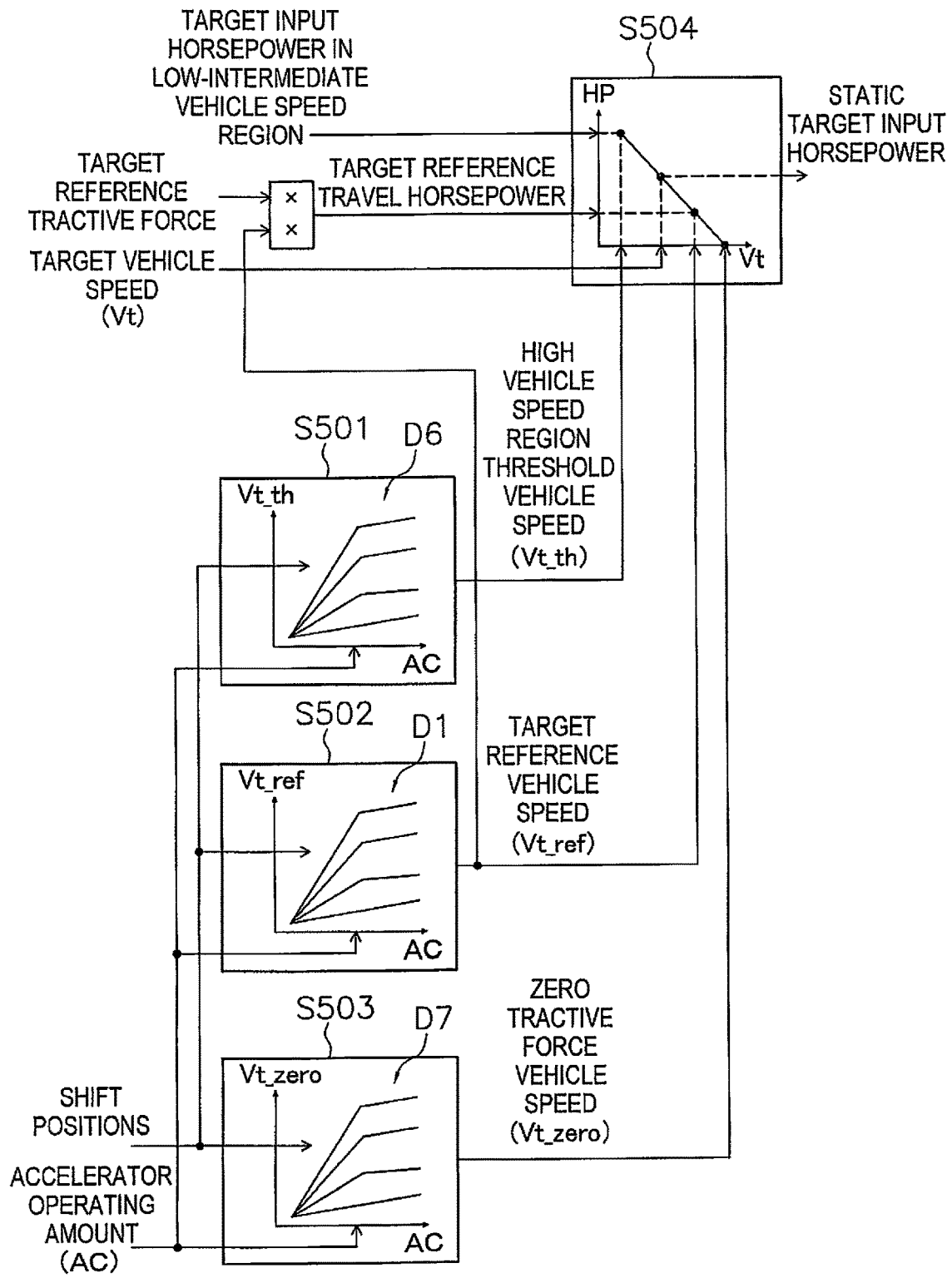
FIG. 11 illustrates processing for determining a target input horsepower in a high vehicle speed region.

FIG. 11 illustrates processing for determining the target input horsepower to the HST 23 in the high vehicle speed region. As illustrated in step S501 in FIG. 11, the controller 72 determines a threshold vehicle speed in the high vehicle speed region from the accelerator operating amount and the shift position. The threshold vehicle speed in the high vehicle speed region is the vehicle speed which represents the boundary between the low-intermediate vehicle speed region and the high vehicle speed region. The storage device 71 stores threshold vehicle speed data D6 which defines the relationship between the accelerator operating amount and the threshold vehicle speed. In the threshold vehicle speed data D6, the threshold vehicle speed increases in accordance with an increase in the accelerator operating amount. The threshold vehicle speed data D6 defines the relationship between the accelerator operating amount and the threshold vehicle speed for each shift position. The threshold vehicle speed increases as the shift position moves to the high speed side even if the accelerator operating amount is the same. The controller 72 refers to the threshold vehicle speed data D6 and determines the threshold vehicle speed corresponding to the accelerator operating amount and the shift position.

In step S502, the controller 72 determines the target reference vehicle speed from the accelerator operating amount and the shift position. The controller 72 refers to the abovementioned reference vehicle speed data D1 and determines the target reference vehicle speed corresponding to the accelerator operating amount and the shift position.

In step S503, the controller 72 determines a zero tractive force vehicle speed from the accelerator operating amount and the shift position. The zero tractive force vehicle speed signifies the target vehicle speed when the tractive force is zero, that is, when the travel load is zero. The storage device 71 stores zero tractive force vehicle speed data D7 which defines the relationship between the accelerator operating amount and the zero tractive force vehicle speed. In the zero tractive force vehicle speed data D7, the zero tractive force vehicle speed increases in accordance with an increase in the accelerator operating amount. The zero tractive force vehicle speed data D7 defines the relationship between the accelerator operating amount and the zero tractive force vehicle speed for each shift position. The zero tractive force vehicle speed increases as the shift position moves to the high speed side even if the accelerator operating amount is the same. The controller 72 refers to the zero tractive force vehicle speed data D7 and determines the zero tractive force vehicle speed corresponding to the accelerator operating amount and the shift position.

When the accelerator operating amount and the shift position are the same, the threshold vehicle speed data D6, the reference vehicle speed data D1, and the zero tractive force vehicle speed data D7 are set so that the following relationship is established: threshold vehicle speed<target reference vehicle speed<zero tractive force vehicle speed.

In step S504, the controller 72 determines a static target input horsepower to the HST 23 from the target vehicle speed. The controller 72 determines the target input horsepower in the abovementioned low-intermediate vehicle speed region as the static target input horsepower when the target vehicle speed is equal to or less than the threshold vehicle speed.

The controller 72 determines a target reference travel horsepower which is calculated by multiplying the target reference tractive force by the target reference vehicle speed, as the static target input horsepower when the target vehicle speed is the target reference vehicle speed. For example, the controller determines the target reference tractive force from the vehicle weight of the work vehicle 1 and a predetermined factor. The vehicle weight and the predetermined factor are stored in the storage device 71.

The controller 72 sets the static target input horsepower to zero when the target vehicle speed is equal to or greater than the zero tractive force vehicle speed. The controller 72 determines the static target input horsepower to the HST 23 by linear interpolation when the target vehicle speed is a value between the threshold vehicle speed and the target reference vehicle speed or a value between the target reference vehicle speed and the zero tractive force vehicle speed.

Figure 12:
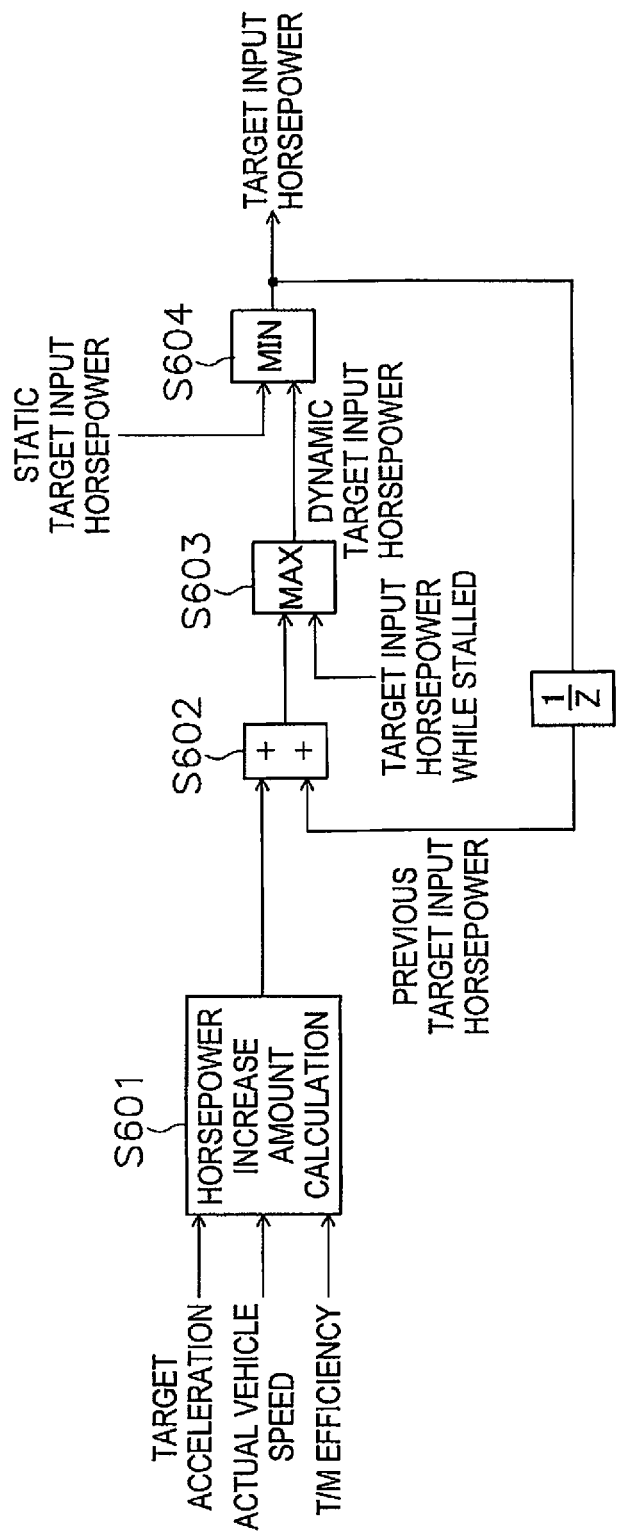
FIG. 12 illustrates processing for determining the target input horsepower during a transition.

The abovementioned static target input horsepower is the target input horsepower to the HST 23 during normal operation. During a transition due to a change in the accelerator operating amount, the controller 72 increases the target input horsepower to the HST 23 at a speed corresponding to the accelerator operating amount within a range that does not exceed the static target input horsepower. FIG. 12 illustrates processing for determining the target input horsepower (dynamic target input horsepower) to the HST 23 during a transition.

As illustrated in step S601 in FIG. 12, the controller 72 determines a horsepower increase amount from the abovementioned target acceleration, the actual vehicle speed, and the transmission efficiency. The horsepower increase amount signifies an increase amount of the input horsepower to the HST 23 per unit of time required for increasing the vehicle speed at the target acceleration.

In step S602, the controller 72 adds the horsepower increase amount to the previous target input horsepower, thereby determining the current target input horsepower. In step S603, the controller 72 selects the larger of the current target input horsepower determined in step S602 and the target input horsepower while stalled, as the dynamic target input horsepower. In step S604, the controller 72 also selects the smaller of the dynamic target input horsepower determined in step S603 and the abovementioned static target input horsepower, as the target input horsepower.

As described above, the controller 72 increases the previous dynamic target input horsepower by the horsepower increase amount corresponding to the accelerator operating amount, and thereby determines the current dynamic target input horsepower. The controller 72 then increases the dynamic target input horsepower for each unit of time between the target input horsepower while stalled and the static target input horsepower.

As illustrated in step S104 in FIG. 6, the controller 72 acquires a work implement operating amount. The controller 72 acquires the work implement operating amount from a signal from the work implement operating sensor 68.

Figure 13:
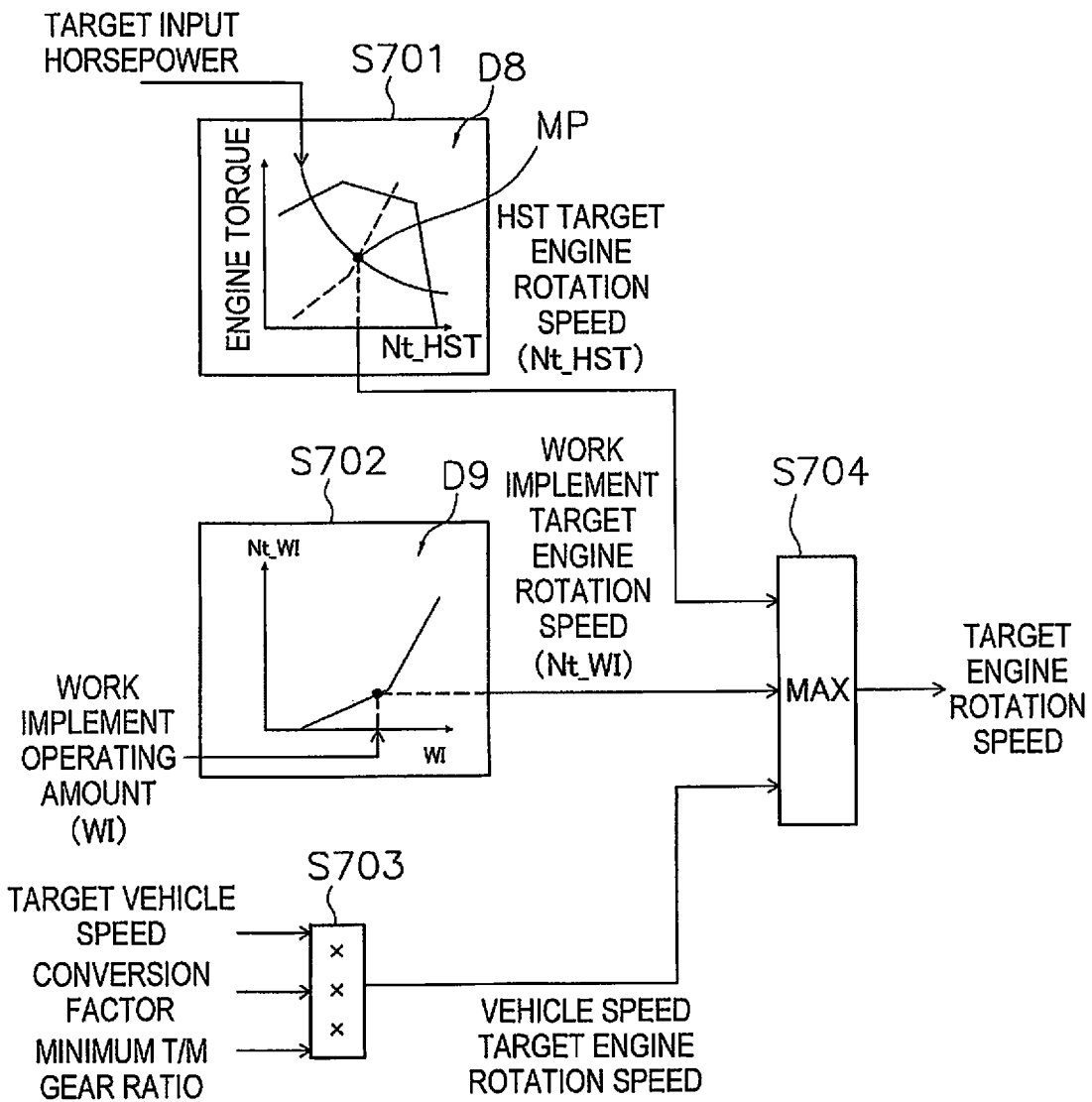
FIG. 13 illustrates processing for determining a target rotation speed of the engine.

In step S105, the controller 72 determines the target engine rotation speed. The controller 72 determines the target engine rotation speed from the target input horsepower to the HST 23 and the work implement operating amount. FIG. 13 illustrates processing for determining the target engine rotation speed.

As illustrated in step S701 in FIG. 13, the controller 72 determines the target engine rotation speed for the HST 23 from the target input horsepower determined in step S604. The storage device 71 stores engine torque–rotation speed data D8 which defines the relationship between the engine torque and the target engine rotation speed for the HST 23. The controller 72 refers to the engine torque–rotation speed data D8 and determines the target engine rotation speed corresponding to the target input horsepower to the HST 23. The controller 72 determines the target engine rotation speed for the HST 23 so that the engine torque and the absorption torque of the travel pump 31 match at a predetermined matching point MP on an equivalent horsepower line corresponding to the target input horsepower.

In step S702, the controller 72 determines the target engine rotation speed for the work implement 3 from the work implement operating amount. The storage device 71 stores target rotation speed data D9 which defines the relationship between the work implement operating amount and the target engine rotation speed for the work implement 3. In the target rotation speed data D9, the target engine rotation speed increases in response to an increase in the work implement operating amount. The controller 72 refers to the target rotation speed data D9 and determines the target engine rotation speed for the work implement 3 corresponding to the work implement operating amount.

In step S703, the controller 72 determines the target engine rotation speed for the vehicle speed from the target vehicle speed. The controller 72 determines a value calculated by multiplying the target vehicle speed by a predetermined conversion factor and the minimum transmission gear ratio, as the target engine rotation speed for the vehicle speed. The predetermined conversion factor is a factor for converting the target vehicle speed to the rotation speed of the output shaft of the HST. The minimum transmission gear ratio is the minimum transmission gear ratio of the HST 23.

In step S704, the controller 72 determines the largest among the target engine rotation speed for the HST 23, the target engine rotation speed for the work implement 3, and the target engine rotation speed for the vehicle speed, as the target engine rotation speed.

The controller 72 next determines a corrected target vehicle speed as illustrated in step S106 in FIG. 6. The controller 72 multiples the abovementioned target vehicle speed by a compensation factor based on a ratio between the target HST differential pressure and the actual HST differential pressure. The corrected target vehicle speed and the compensation factor are discussed below.

As illustrated in step S107 in FIG. 6, the controller 72 determines the target displacement of the travel pump 31 next. The controller 72 determines the target displacement of the travel pump 31 from the corrected target vehicle speed and the target engine rotation speed determined in step S704. In addition, in step S108, the controller 72 determines the target displacement of the travel motor 33. The controller 72 determines the target displacement of the travel motor 33 from the corrected target vehicle speed and the target engine rotation speed determined in step S704.

Figure 14A:
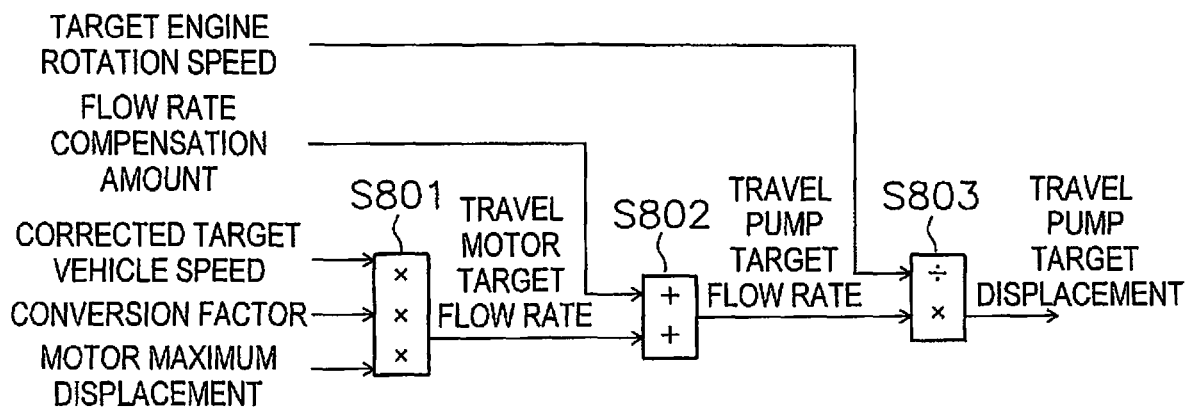
FIG. 14A and FIG. 14B illustrate processing for determining target displacements of the travel pump and the travel motor.

FIG. 14A illustrates processing for determining the target displacement of the travel pump 31. As illustrated in step S801 in FIG. 14A, the controller 72 determines the target flow rate of the travel motor 33 from the corrected target vehicle speed. The controller 72 determines the target flow rate of the travel motor 33 based on a value derived by multiplying the corrected target vehicle speed by a predetermined conversion factor and the maximum displacement of the travel motor 33. The predetermined conversion factor is a factor for converting the corrected target vehicle speed to the rotation speed of the output shaft of the HST 23.

In step S802, the controller 72 determines the target flow rate of the travel pump 31 from the target flow rate of the travel motor 33 determined in step S801 and a flow rate compensation amount. The controller 72 adds the flow rate compensation amount to the target flow rate of the travel motor 33, thereby determining the target flow rate of the travel pump 31. The method for determining the flow rate compensation amount is explained below.

In step S803, the controller 72 determines the target displacement of the travel pump 31 from the target engine rotation speed and the target flow rate of the travel pump 31. The controller 72 calculates the target displacement of the travel pump 31 based on a value derived by dividing the target flow rate of the travel pump 31 by the target engine rotation speed.

Figure 14B:
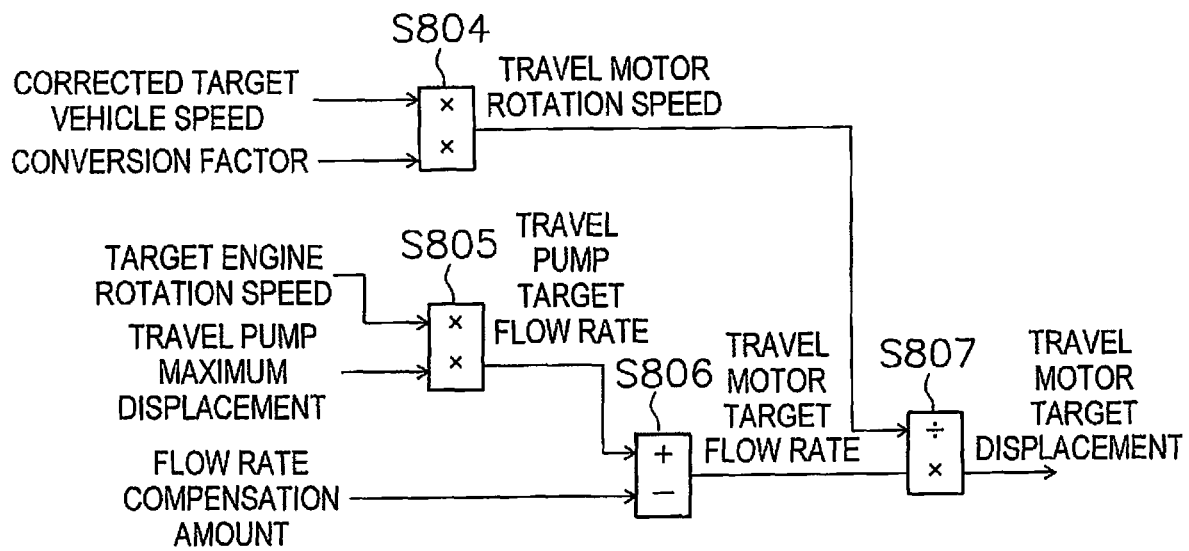

FIG. 14B illustrates processing for determining the target displacement of the travel motor 33. As illustrated in step S804 in FIG. 14B, the controller 72 determines the rotation speed of the travel motor 33 from the corrected target vehicle speed. The controller 72 multiplies the corrected target vehicle speed by a predetermined conversion factor, thereby calculating the rotation speed of the travel motor 33. The predetermined conversion factor is a factor for converting the corrected target vehicle speed to the rotation speed of the output shaft of the HST 23.

In step S805, the controller 72 determines the target flow rate of the travel pump 31 from the target engine rotation speed and the maximum displacement of the travel pump 31. The controller 72 calculates the target flow rate of the travel pump 31 based on a value derived by multiplying the engine rotation speed by the maximum displacement of the travel pump 31.

In step S806, the controller 72 determines the target flow rate of the travel motor 33 from the target flow rate of the travel pump 31 determined in step S805, and the flow rate compensation amount. The controller 72 subtracts the flow rate compensation amount from the target flow rate of the travel pump 31, thereby determining the target flow rate of the travel motor 33.

In step S807, the controller 72 determines the target displacement of the travel motor 33 from the rotation speed of the travel motor 33 and the target flow rate of the travel motor 33. The controller 72 calculates the target displacement of the travel motor 33 based on a value derived by dividing the target flow rate of the travel motor 33 by the rotation speed of the travel motor 33.

As illustrated in step S109 in FIG. 6, the controller 72 outputs instruction signals. The controller 72 outputs an instruction signal to the fuel injection device 24 so that the engine 21 is driven at the target engine rotation speed. The controller 72 outputs an instruction signal to the pump displacement control device 45 so that the travel pump 31 is driven at the target displacement. The controller 72 outputs an instruction signal to the motor displacement control device 35 so that the travel motor 33 is driven at the target displacement.

Figure 15:
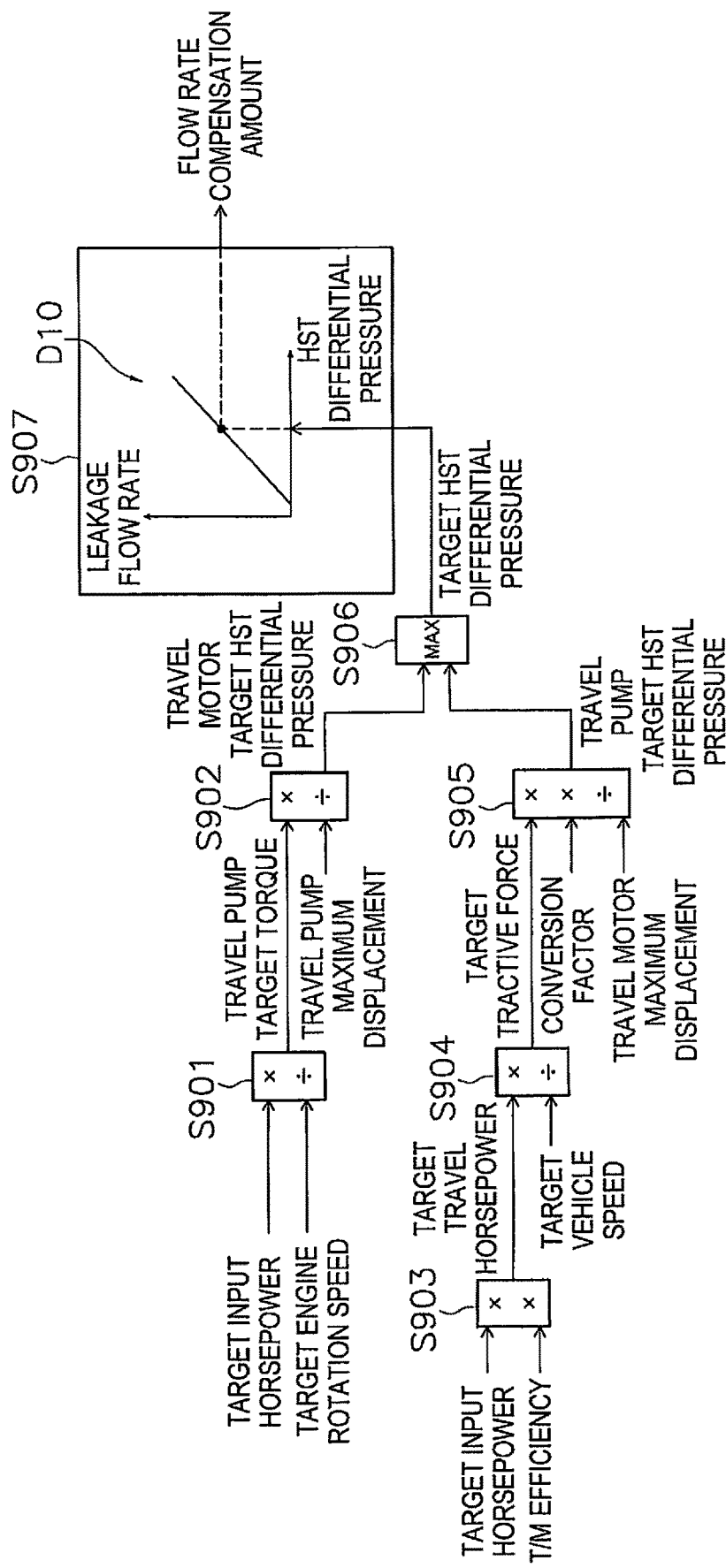
FIG. 15 illustrates processing for determining a flow rate compensation amount.

A method for determining the abovementioned flow rate compensation amount will be explained next. FIG. 15 illustrates processing for determining the flow rate compensation amount. As illustrated in step S901 in FIG. 15, the controller 72 determines a target torque of the travel pump 31 from the target input horsepower to the HST 23 determined in step S604 and the target engine rotation speed determined in step S704. The controller 72 determines the target torque of the travel pump 31 by dividing the target input horsepower by the target engine rotation speed.

In step S902, the controller 72 determines a target HST differential pressure of the travel motor 33 from the target torque of the travel pump 31 and the maximum displacement of the travel pump 31. The controller 72 determines the target HST differential pressure of the travel motor 33 based on a value derived by dividing the target torque of the travel pump 31 by the maximum displacement of the travel pump 31.

In step S903, the controller 72 determines a target travel horsepower from the target input horsepower to the HST 23 determined in step S604. The controller 72 multiplies the target input horsepower to the HST 23 by the transmission efficiency, thereby determining the target travel horsepower.

In step S904, the controller 72 determines a target tractive force from the target travel horsepower and the target vehicle speed. The controller 72 divides the target travel horsepower by the target vehicle speed, thereby determining the target tractive force.

In step S905, the controller 72 determines a target HST differential pressure of the travel pump 31 from the target tractive force and the maximum displacement of the travel motor 33. The controller 72 determines the target HST differential pressure of the travel pump 31 based on a value derived by multiplying the target tractive force by a predetermined conversion factor and dividing the result by the maximum displacement of the travel motor 33. The predetermined conversion factor is a factor for converting the target tractive force to the torque of the output shaft of the HST 23.

In step S906, the controller 72 determines the larger among the target HST differential pressure of the travel motor 33 and the target HST differential pressure of the travel pump 31, as the target HST differential pressure.

In step S907, the controller 72 determines the flow rate compensation amount from the target HST differential pressure. The storage device 71 stores leakage flow rate data D10 which indicates the relationship between the HST differential pressure and the leakage flow rate of hydraulic fluid in the drive hydraulic circuit 32. The leakage flow rate of hydraulic fluid is the flow rate of hydraulic fluid that leaks from the hydraulic equipment in the HST 23 and has a correlation with the HST differential pressure. Accordingly, the relationship between the HST differential pressure and the leakage flow rate of hydraulic fluid in the drive hydraulic circuit 32 is derived by preliminary testing or simulation and is set as the leakage flow rate data D10. The controller 72 refers to the leakage flow rate data D10, determines the leakage flow rate corresponding to the target HST differential pressure, and determines the leakage flow rate as the flow rate compensation amount.

Figure 16:
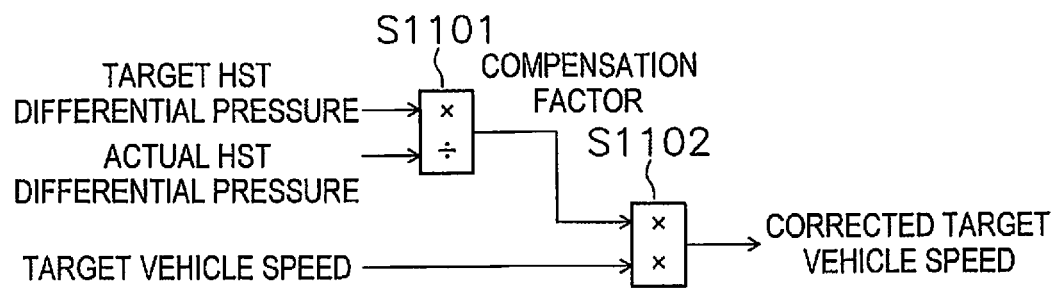
FIG. 16 illustrates processing for determining a corrected target vehicle speed.

A method for determining the abovementioned corrected target vehicle speed will be explained next. FIG. 16 illustrates processing for determining the corrected target vehicle speed. As illustrated in step S1101 in FIG. 16, the controller 72 determines a compensation factor from a ratio of the target HST differential pressure determined in step S906 and the actual differential pressure. The controller 72 determines, as the actual HST differential pressure, the difference between the hydraulic pressure of the first drive circuit 32a detected by the first circuit pressure sensor 34a and the hydraulic pressure of the second drive circuit 32b detected by the second circuit pressure sensor 34b. The controller 72 divides the target HST differential pressure by the actual HST differential pressure thereby determining the compensation factor.

The controller 72 may be able to adjust the compensation factor with the gain. The controller 72 may determine the compensation factor so as to satisfy the following equation (1).

$$\text{target vehicle speed/target reference vehicle speed} \le \text{compensation factor} < \text{target reference vehicle speed/target vehicle speed} \tag{1}$$

In step S1102, the controller 72 multiplies the target vehicle speed by the compensation factor, thereby determining the corrected target vehicle speed.

In the work vehicle 1 according to the present embodiment explained above, the compensation factor is calculated based on a ratio between the target HST differential pressure and the actual HST differential pressure, and the target displacement of the travel pump 31 and the target displacement of the travel motor 33 are determined from the corrected target vehicle speed derived by multiplying the target vehicle speed by the compensation factor. As a result, even if the actual HST differential pressure diverges from the target HST differential pressure due to the effect of leakage or the like of hydraulic fluid in the drive hydraulic circuit 32, the target displacement of the travel pump 31 and the target displacement of the travel motor 33 can be determined based on the compensation factor that corresponds to a divergence of the target HST differential pressure and the actual HST differential pressure. Consequently, the desired output of the work vehicle 1 can be achieved with accuracy.

Although an embodiment of the present invention has been described so far, the present invention is not limited to the above embodiments and various modifications may be made within the scope of the invention.

The work vehicle 1 is not limited to a wheel loader and may be another type of vehicle such as a motor grader and the like. The configurations of the drive system and the control system in the work vehicle 1 are not limited to the above embodiment and may be modified. For example, the displacement of the travel pump 31 may be controlled by another control valve and is not limited to control by the pump control valve 47. That is, a control valve for controlling the pressure of the hydraulic fluid supplied to the pump control cylinder 46 through the pump pilot circuit 48 may be provided separately from the pump control valve 47. The parameters used in the various abovementioned computations are not limited to the parameters described above and may be changed. Alternatively, parameters other than the abovementioned parameters may be used in the computations. The various types of the data described above may be represented, for example, by formulas, or may be in a format such as a table or a map. The volume change amount of the hydraulic fluid may be determined from data such as a table or a map and is not limited to the abovementioned formula. The order of the abovementioned processing may be modified. Alternatively, a portion of the processing may be performed concurrently. For example, step S101 and step S104 may be performed concurrently. Alternatively, a portion of the abovementioned processing may be omitted.

The controller 72 may determine the target vehicle speed with a method different from the above embodiment. The controller 72 may determine the target input horsepower to the HST 23 with a method different from the above embodiment. The controller 72 may determine the target engine rotation speed with a method different from the above embodiment. The controller 72 may determine the target displacement of the travel pump 31 with a method different from the above embodiment. The controller 72 may determine the target displacement of the travel motor 33 with a method different from the above embodiment.

The controller 72 may determine only one of the target displacement of the travel pump 31 and the target displacement of the travel motor 33 based on the compensation factor that corresponds to the divergence of the target HST differential pressure and the actual HST differential pressure.

Figure 17A:
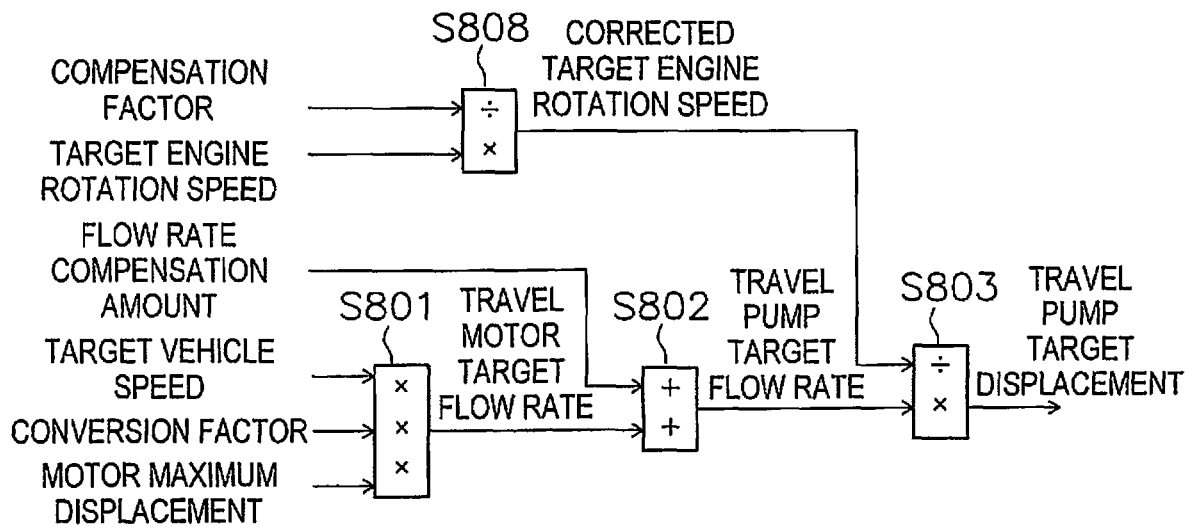
FIG. 17A and FIG. 17B illustrate processing according to a first modified example.
Figure 17B:
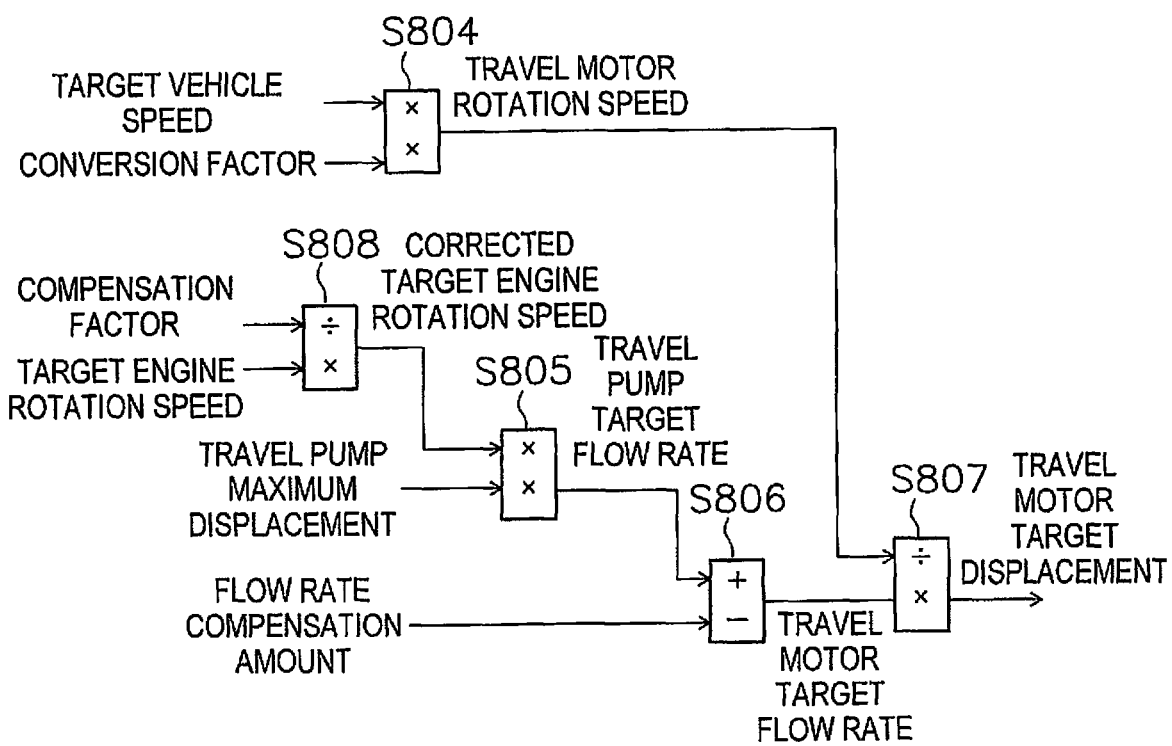

In the above embodiment, the controller 72 compensates the target vehicle speed with the compensation factor. However, the controller 72 may compensate other parameters with the compensation factor. For example, FIG. 17A and FIG. 17B illustrate processing according to a first modified example. As illustrated in step S808 in FIG. 17A, the controller 72 may divide the target engine rotation speed by the compensation factor, thereby determining a corrected target engine rotation speed. In step S803, the controller 72 may determine the target displacement of the travel pump 31 from the corrected target engine rotation speed.

As illustrated in step S805 in FIG. 17B, the controller 72 may determine the target flow rate of the travel pump 31 from the corrected target engine rotation speed and the maximum displacement of the travel pump 31. That is, the controller 72 may determine the target displacement of the travel motor 33 from the corrected target engine rotation speed.

Figure 18A:
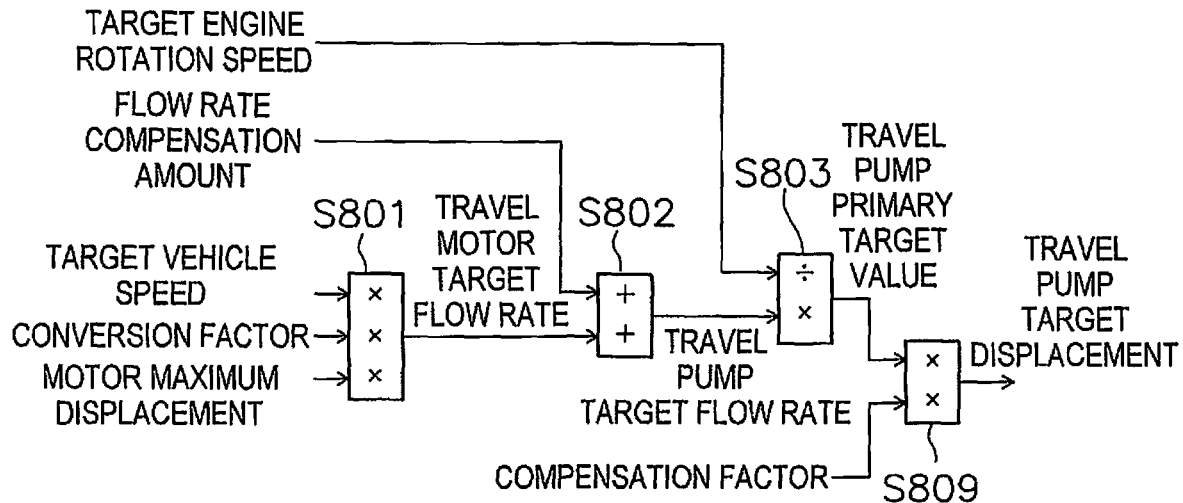
FIG. 18A and FIG. 18B illustrate processing according to a second modified example.
Figure 18B:
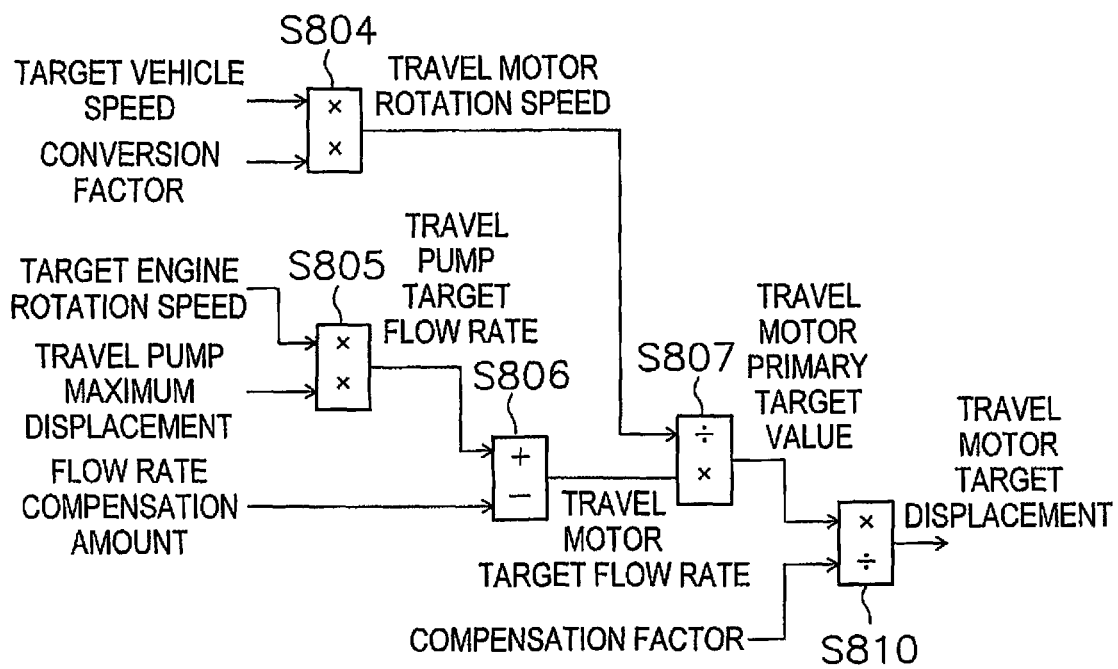

FIG. 18A and FIG. 18B illustrate processing according to a second modified example. As illustrated in step S803 in FIG. 18A, the controller 72 may determine a primary target value of the displacement of the travel pump 31. In step S809, the controller 72 may multiply the primary target value by the compensation factor, thereby determining the target displacement of the travel pump 31.

As illustrated in step S807 in FIG. 18B, the controller 72 may determine the primary target value of the displacement of the travel motor 33. In step S810, the controller 72 may divide the primary target value by the compensation factor, thereby determining the target displacement of the travel motor 33.

Figure 19A:
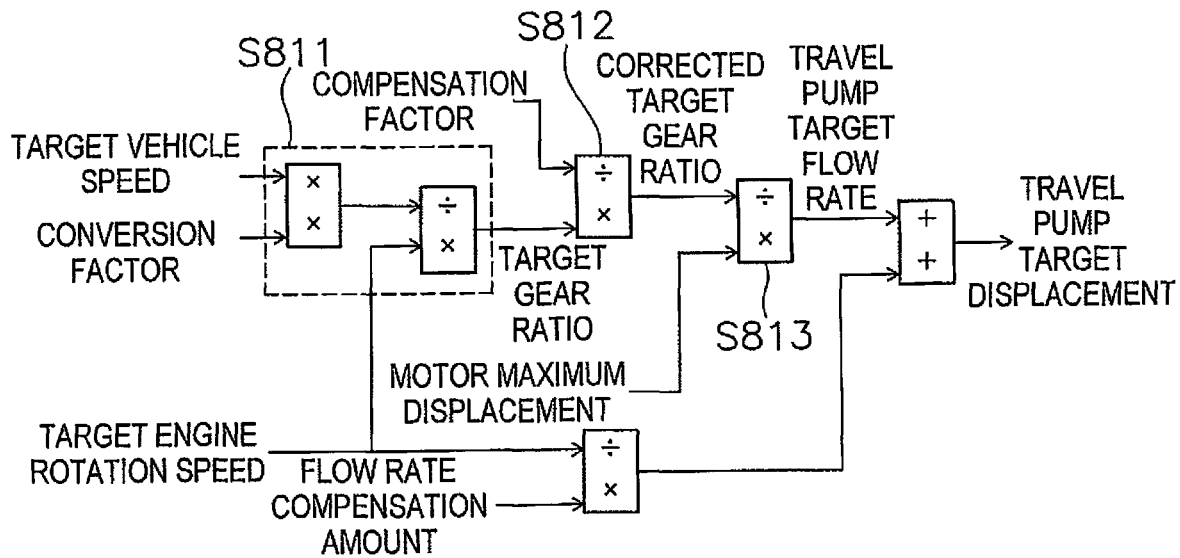
FIG. 19A and FIG. 19B illustrate processing according to a third modified example.
Figure 19B:
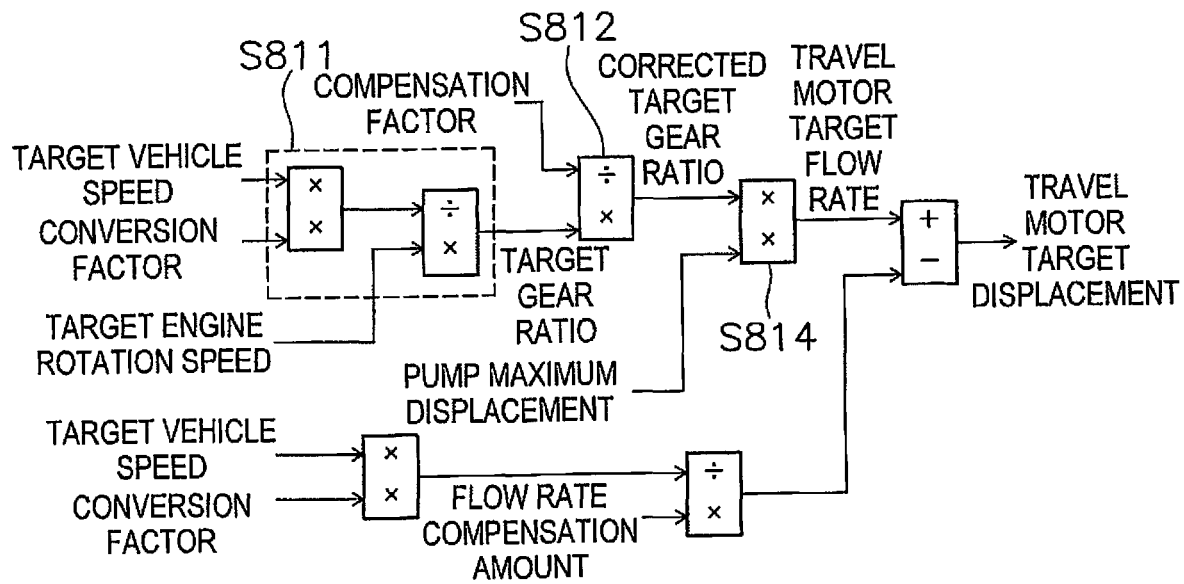

FIG. 19A and FIG. 19B illustrate processing according to a third modified example. As illustrated in step S811 in FIG. 19A and FIG. 19B, the controller 72 may determine a target transmission gear ratio of the HST 23 from the target vehicle speed. In step S812, the controller 72 may multiply the target transmission gear ratio by the compensation factor, thereby determining a corrected target transmission gear ratio. In step S813 in FIG. 19A and in step S814 in FIG. 19B, the controller 72 may determine the target displacement of the travel pump 31 and the target displacement of the travel motor 33 from the corrected target transmission gear ratio.

The abovementioned actual HST differential pressure may be determined based on the charge relief pressure. That is, the difference between the abovementioned drive circuit pressure and the charge relief pressure may be determined as the actual HST differential pressure. The target HST differential pressure may be determined based on the charge relief pressure in the same way.

The compensation factor may be determined with a method other than the abovementioned formula (1). The compensation factor may be determined based on a map or a table that stores the relationships between the target reference vehicle speed, the target vehicle speed, and the compensation factor.

According to the present invention, a desired output in a work vehicle provided with a hydrostatic transmission can be achieved with accuracy even when the actual differential pressure and the target differential pressure diverge.

What is claimed is:

1. A work vehicle comprising:
    an engine;
    a hydrostatic transmission including
        a travel pump configured to be driven by the engine, the travel pump including a first pump port and a second pump port,
        a travel motor including a first motor port and a second motor port, and
        a hydraulic circuit connecting the travel pump and the travel motor, the hydraulic circuit including
            a first circuit connecting the first pump port and the first motor port, and
            a second circuit connecting the second pump port and the second motor port;
    a pressure sensor configured to output a signal indicative of a hydraulic pressure in at least one of the first circuit and the second circuit, the pressure sensor including
        a first pressure sensor configured to output a signal indicative of the hydraulic pressure in the first circuit, and
        a second pressure sensor configured to output a signal indicative of the hydraulic pressure in the second circuit;
    an accelerator operating member;
    an accelerator operating sensor configured to output a signal indicative of an operating amount of the accelerator operating member; and
    a controller configured to receive signals from the pressure sensor and the accelerator operating sensor, the controller being configured to
        determine a compensation factor from the operating amount of the accelerator operating member and the hydraulic pressures in at least one of the first circuit and the second circuit,
        determine a target vehicle speed from the operating amount of the accelerator operating member,
        determine at least one of a target displacement of the travel pump and a target displacement of the travel motor from the target vehicle speed and the compensation factor,
        determine a target differential pressure between the first circuit and the second circuit from the operating amount of the accelerator operating member,
        acquire an actual differential pressure between the first circuit and the second circuit from the signal from the first pressure sensor and the signal from the second pressure sensor, and
        determine the compensation factor based on the target differential pressure and the actual differential pressure.

2. The work vehicle according to claim 1, wherein the controller is further configured to determine the compensation factor based on a ratio between the target differential pressure and the actual differential pressure.

3. A work vehicle according to claim 1, wherein the controller is further configured to
    determine a target gear ratio of the hydrostatic transmission from the target differential pressure,
    determine a corrected target gear ratio based on the target gear ratio and the compensation factor, and
    determine at least one of the target displacement of the travel pump and the target displacement of the travel motor from the corrected target gear ratio.

4. The work vehicle according to claim 3, wherein the controller is further configured to determine the corrected target gear ratio by dividing the target gear ratio by the compensation factor.

5. The work vehicle according to claim 1, wherein the controller is further configured to
    determine a corrected target vehicle speed based on the target vehicle speed and the compensation factor, and
    determine at least one of the target displacement of the travel pump and the target displacement of the travel motor from the corrected target vehicle speed.

6. The work vehicle according to claim 5, wherein the controller is further configured to determine the corrected target vehicle speed by multiplying the target vehicle speed by the compensation factor.

7. The work vehicle according to claim 1, wherein the controller is further configured to
    determine a target rotation speed of the engine from the operating amount of the accelerator operating member,
    determine a corrected target rotation speed based on the target rotation speed of the engine and the compensation factor, and
    determine at least one of the target displacement of the travel pump and the target displacement of the travel motor from the corrected target rotation speed.

8. The work vehicle according to claim 7, wherein the controller is further configured to determine the corrected target rotation speed by dividing the target rotation speed of the engine by the compensation factor.

9. The work vehicle according to claim 1, further comprising:
    a work implement operating member; and
    a work implement operating sensor configured to output a signal indicative of an operating amount of the work implement operating member,
    the controller being further configured to
        receive the signal from the work implement operating sensor,
        determine a target input horsepower of the hydrostatic transmission from the operating amount of the accelerator operating member,
        determine the target rotation speed of the engine from the target input horsepower and the operating amount of the work implement operating member,
        determine a pump target differential pressure indicative of a target value of the differential pressure between the first circuit and the second circuit for the travel motor, from the target input horsepower and the target rotation speed of the engine, determine a motor target differential pressure indicative of a target value of the differential pressure between the first circuit and the second circuit for the travel motor, from the target vehicle speed and the target output horsepower, and determine a larger of the pump target differential pressure and the motor target differential pressure as the target differential pressure.

10. A work vehicle comprising:

an engine;

a hydrostatic transmission including a travel pump configured to be driven by the engine, the travel pump including a first pump port and a second pump port, a travel motor including a first motor port and a second motor port, and a hydraulic circuit connecting the travel pump and the travel motor, the hydraulic circuit including a first circuit connecting the first pump port and the first motor port, and a second circuit connecting the second pump port and the second motor port;

a pressure sensor configured to output a signal indicative of a hydraulic pressure in at least one of the first circuit and the second circuit;

an accelerator operating member;

an accelerator operating sensor configured to output a signal indicative of an operating amount of the accelerator operating member; and a controller configured to receive signals from the pressure sensor and the accelerator operating sensor, the controller being configured to determine a compensation factor from the operating amount of the accelerator operating member and the hydraulic pressures in at least one of the first circuit and the second circuit, determine a target vehicle speed from the operating amount of the accelerator operating member, determine at least one of a target displacement of the travel pump and a target displacement of the travel motor from the target vehicle speed and the compensation factor, determine a primary target value of the displacement of the travel pump from the target vehicle speed, and determine the target displacement of the travel pump based on the primary target value and the compensation factor.

11. The work vehicle according to claim 10, wherein the controller is further configured to determine the target displacement of the travel pump by multiplying the primary target value by the compensation factor.

12. A work vehicle comprising:

an engine;

a hydrostatic transmission including a travel pump configured to be driven by the engine, the travel pump including a first pump port and a second pump port, a travel motor including a first motor port and a second motor port, and a hydraulic circuit connecting the travel pump and the travel motor, the hydraulic circuit including a first circuit connecting the first pump port and the first motor port, and a second circuit connecting the second pump port and the second motor port;

a pressure sensor configured to output a signal indicative of a hydraulic pressure in at least one of the first circuit and the second circuit;

an accelerator operating member;

an accelerator operating sensor configured to output a signal indicative of an operating amount of the accelerator operating member; and a controller configured to receive signals from the pressure sensor and the accelerator operating sensor, the controller being configured to determine a compensation factor from the operating amount of the accelerator operating member and the hydraulic pressures in at least one of the first circuit and the second circuit, determine a target vehicle speed from the operating amount of the accelerator operating member, determine at least one of a target displacement of the travel pump and a target displacement of the travel motor from the target vehicle speed and the compensation factor, determine a primary target value of the displacement of the travel motor from the target vehicle speed, and determine the target displacement of the travel motor based on the primary target value and the compensation factor.

13. The work vehicle according to claim 12, wherein the controller is further configured to determine the target displacement of the travel motor by dividing the primary target value by the compensation factor.

\* \* \* \* \*